United States Patent
Gustafsson et al.

(10) Patent No.: US 10,370,820 B2
(45) Date of Patent: *Aug. 6, 2019

(54) LAYING MACHINE AND A BLADE ASSEMBLY

(71) Applicant: HUSQVARNA AB, Huskvarna (SE)

(72) Inventors: Lars Gustafsson, Töreboda (SE); Rolf Johansson, Glumslöv (SE); Fredrik Sjödahl, Jönköping (SE); Tobias Nilsson, Huskvarna (SE); Donald F. Meister, Overland Park, KS (US)

(73) Assignee: HUSQVARNA AB, Huskvarna (SE)

( * ) Notice: Subject to any disclaimer, the term of this patent is extended or adjusted under 35 U.S.C. 154(b) by 109 days.

This patent is subject to a terminal disclaimer.

(21) Appl. No.: 15/000,598

(22) Filed: Jan. 19, 2016

(65) Prior Publication Data
US 2016/0130781 A1 May 12, 2016

Related U.S. Application Data

(63) Continuation of application No. 13/982,253, filed as application No. PCT/SE2012/000007 on Jan. 26, 2012, now Pat. No. 9,267,620.

(30) Foreign Application Priority Data

Jan. 26, 2011 (WO) .................. PCT/SE2011/000013
Jul. 21, 2011 (WO) .................. PCT/SE2011/050958

(51) Int. Cl.
*E02F 9/00* (2006.01)
*E02F 5/08* (2006.01)
(Continued)

(52) U.S. Cl.
CPC ................ *E02F 5/08* (2013.01); *E02F 3/188* (2013.01); *E02F 5/10* (2013.01); *E02F 5/101* (2013.01);
(Continued)

(58) Field of Classification Search
CPC ... E02F 3/188; E02F 5/08; E02F 5/101; E02F 5/145; E02F 7/02; E02F 9/00; F16L 1/032; H02G 1/06
See application file for complete search history.

(56) References Cited

U.S. PATENT DOCUMENTS

| | | |
|---|---|---|
| RE10,688 E | 2/1886 | Moscopoulos |
| 1,457,594 A | 6/1923 | Neary |

(Continued)

FOREIGN PATENT DOCUMENTS

| | | |
|---|---|---|
| CN | 101614302 A | 12/2009 |
| DE | 1201441 B | 9/1965 |

(Continued)

OTHER PUBLICATIONS

International Search Report and Written Opinion in International patent application No. PCT/SE2011/050958, dated May 7, 2012.
(Continued)

*Primary Examiner* — Benjamin F Fiorello
(74) *Attorney, Agent, or Firm* — Burr Forman McNair

(57) ABSTRACT

The present invention relates to a laying machine for laying at least one flexible casing or tube, cable or wire including: a blade arrangement for making a trench in the ground, a consolidation and laying means being arranged behind the blade arrangement, for clearing and safe-guarding the trench from collapsing while laying at least one flexible casing or tube, cable or wire into the trench. A blade assembly comprising compartments for cooling fluid and air.

20 Claims, 21 Drawing Sheets

(51) Int. Cl.
    *E02F 3/18*     (2006.01)
    *E02F 5/10*     (2006.01)
    *E02F 5/14*     (2006.01)
    *E02F 7/02*     (2006.01)
    *H02G 1/06*     (2006.01)
    *F16L 1/032*     (2006.01)
    *E02F 5/12*     (2006.01)
    *F16L 1/028*     (2006.01)

(52) U.S. Cl.
    CPC ............... *E02F 5/12* (2013.01); *E02F 5/145* (2013.01); *E02F 7/02* (2013.01); *E02F 9/00* (2013.01); *F16L 1/028* (2013.01); *F16L 1/032* (2013.01); *H02G 1/06* (2013.01)

(56) References Cited

U.S. PATENT DOCUMENTS

| | | | |
|---|---|---|---|
| 1,498,162 A | 6/1924 | Gillespie |
| 1,579,566 A | 4/1926 | Packer |
| 1,580,673 A | 4/1926 | Page |
| 1,644,252 A | 10/1927 | Housman |
| 1,693,353 A | 11/1928 | Slavin |
| 1,695,480 A | 12/1928 | Buoy |
| 1,703,546 A | 2/1929 | Roe |
| 1,749,741 A | 3/1930 | Green |
| 1,777,626 A | 10/1930 | Rayburn |
| 1,850,767 A | 3/1932 | Page |
| 1,882,147 A | 10/1932 | Humphreys et al. |
| 1,903,399 A | 4/1933 | Wait |
| 1,913,425 A | 6/1933 | Forsyth |
| 1,917,492 A | 7/1933 | Brendlin |
| 1,933,759 A | 11/1933 | Ratkowski |
| 1,951,909 A | 3/1934 | Judson |
| 1,979,738 A | 11/1934 | Gibson |
| 1,989,334 A | 1/1935 | Page |
| 2,032,851 A | 3/1936 | Page |
| 2,066,519 A | 1/1937 | Clark |
| 2,146,663 A | 2/1939 | Coulter |
| 2,261,233 A | 11/1941 | Vern |
| 2,325,336 A | 7/1943 | Victor |
| 2,338,831 A | 1/1944 | Whitcomb et al. |
| 2,365,441 A | 12/1944 | Smith |
| 2,372,800 A | 4/1945 | Stearns |
| 2,391,876 A | 1/1946 | Brown |
| 2,401,625 A | 6/1946 | Ernst |
| 2,414,994 A | 1/1947 | Wright |
| 2,592,419 A | 4/1952 | Harper et al. |
| 2,688,817 A | 9/1954 | Brune |
| 2,721,411 A | 10/1955 | Emil |
| 2,795,883 A | 6/1957 | Ras |
| 2,807,256 A | 9/1957 | Woolley |
| 2,890,543 A | 6/1959 | Mitchell |
| 2,909,134 A | 10/1959 | Kniefel |
| 3,022,765 A | 2/1962 | Xenis |
| 3,023,551 A | 3/1962 | Osenberg |
| 3,156,996 A | 11/1964 | Luketa |
| 3,162,187 A | 12/1964 | Christensen |
| 3,195,261 A | 7/1965 | Luketa |
| 3,232,358 A | 2/1966 | Heiberg |
| 3,282,263 A | 11/1966 | Christensen et al. |
| 3,286,476 A | 11/1966 | MaClay |
| 3,292,379 A | 12/1966 | McElvany |
| 3,313,115 A | 4/1967 | Kniefel |
| 3,339,368 A | 9/1967 | Takuji et al. |
| 3,366,969 A | 1/1968 | Luketa |
| 3,422,631 A | 1/1969 | Silverman |
| 3,435,793 A | 4/1969 | Shurtleff |
| 3,508,411 A | 4/1970 | Rogers |
| 3,514,960 A | 6/1970 | Howard |
| 3,551,983 A | 1/1971 | Newbury |
| 3,561,222 A | 2/1971 | Sweeton et al. |
| 3,585,804 A | 6/1971 | Sramek |
| 3,608,217 A | 9/1971 | Voisin, Sr. |
| 3,618,237 A | 11/1971 | Davis |
| 3,635,036 A | 1/1972 | Hooper, Jr. |
| 3,664,137 A | 5/1972 | Lett |
| 3,668,879 A | 6/1972 | Ogle |
| 3,702,062 A | 11/1972 | Olson |
| 3,713,300 A * | 1/1973 | Ward ................. H02G 1/06 |
| | | | 172/40 |
| 3,727,332 A | 4/1973 | Zimmer |
| 3,750,451 A | 8/1973 | Nolan, Jr. |
| 3,874,182 A | 4/1975 | Potter et al. |
| 3,903,931 A | 9/1975 | Moulin et al. |
| 3,914,948 A | 10/1975 | Kaercher, Jr. |
| 3,927,164 A | 12/1975 | Shimabukuro |
| 3,930,310 A | 1/1976 | Santilli |
| 3,998,065 A | 12/1976 | Darnell |
| 4,014,175 A | 3/1977 | Brink |
| 4,022,182 A | 5/1977 | Lenkevich |
| 4,038,828 A | 8/1977 | Schuck et al. |
| 4,089,131 A | 5/1978 | Phillips |
| 4,218,158 A | 8/1980 | Tesson |
| 4,318,641 A | 3/1982 | Hogervorst |
| 4,326,347 A | 4/1982 | Ballinger |
| 4,329,794 A | 5/1982 | Rogers |
| 4,399,629 A | 8/1983 | Duncan |
| 4,458,605 A | 7/1984 | Herring, Jr. et al. |
| 4,461,598 A | 7/1984 | Flechs |
| 4,503,630 A * | 3/1985 | Riley ................. E02F 3/188 |
| | | | 172/112 |
| 4,504,171 A | 3/1985 | Florence, Jr. |
| 4,542,940 A | 9/1985 | Marten |
| 4,563,929 A | 1/1986 | Ringlee et al. |
| 4,653,362 A | 3/1987 | Gerber |
| 4,714,381 A | 12/1987 | Hatch |
| 4,720,211 A | 1/1988 | Streatfield et al. |
| 4,776,370 A | 10/1988 | Long, Jr. |
| 4,806,043 A | 2/1989 | Fournier |
| 4,812,078 A | 3/1989 | Rivard |
| 4,825,569 A | 5/1989 | Porter |
| 4,877,355 A | 10/1989 | Van Pelt |
| 4,927,294 A | 5/1990 | Magnani et al. |
| 4,944,872 A | 7/1990 | Kantor |
| 4,965,955 A | 10/1990 | Campbell et al. |
| 4,981,396 A | 1/1991 | Albertson et al. |
| 5,027,534 A | 7/1991 | Sackett |
| 5,039,252 A | 8/1991 | Schuermann |
| 5,106,440 A | 4/1992 | Tangeman |
| 5,167,215 A | 12/1992 | Harding, Jr. |
| 5,173,009 A | 12/1992 | Moriarty |
| 5,174,686 A | 12/1992 | Raymond |
| 5,197,453 A | 3/1993 | Messina |
| 5,214,868 A | 6/1993 | Persbacker |
| 5,265,647 A | 11/1993 | Taylor et al. |
| 5,285,484 A | 2/1994 | Shibanuma et al. |
| 5,303,688 A | 4/1994 | Chiuminatta et al. |
| 5,320,451 A | 6/1994 | Garvey et al. |
| 5,343,641 A | 9/1994 | Gregory |
| 5,358,358 A | 10/1994 | Tassone et al. |
| 5,361,528 A | 11/1994 | Peacock |
| 5,385,752 A | 1/1995 | Steele |
| 5,494,374 A | 2/1996 | Youngs et al. |
| 5,515,624 A | 5/1996 | Beatty |
| 5,626,438 A | 5/1997 | Etheridge |
| 5,642,912 A | 7/1997 | Parish, II |
| 5,879,109 A | 3/1999 | Finzel et al. |
| 5,913,638 A | 6/1999 | Lansdale |
| 5,915,878 A | 6/1999 | Carpenter |
| 5,915,886 A | 6/1999 | McNeil |
| 5,975,804 A | 11/1999 | Bockman |
| 5,996,194 A | 12/1999 | Redman et al. |
| 6,189,244 B1 * | 2/2001 | Johnson ................. E02F 5/06 |
| | | | 37/349 |
| 6,299,382 B1 | 10/2001 | Wentworth |
| 6,305,880 B1 | 10/2001 | Carter et al. |
| 6,371,691 B1 | 4/2002 | Finzel et al. |
| 6,457,267 B1 | 10/2002 | Porter et al. |
| 6,551,028 B2 | 4/2003 | Robinson |
| 6,585,453 B2 | 7/2003 | Robinson |
| 6,592,299 B1 | 7/2003 | Becker |
| 6,637,978 B1 * | 10/2003 | Genta ................. E02F 5/08 |
| | | | 405/174 |

(56) References Cited

U.S. PATENT DOCUMENTS

| | | |
|---|---|---|
| 6,718,660 B2 | 4/2004 | Rivard |
| 6,718,900 B2 | 4/2004 | Carter |
| 6,769,423 B1 | 8/2004 | Zhang |
| 6,807,355 B2 | 10/2004 | Dofher |
| 6,821,054 B2 | 11/2004 | Ballard |
| 6,837,654 B2 | 1/2005 | Serrano |
| 6,846,029 B1 | 1/2005 | Ragner et al. |
| 6,915,754 B2 | 7/2005 | Tsuyoshi Komura et al. |
| 6,954,999 B1 | 10/2005 | Richardson et al. |
| 7,050,683 B2 | 5/2006 | Dofher |
| 7,293,375 B2 | 11/2007 | Fukushima et al. |
| 7,351,009 B2 | 4/2008 | Serrano et al. |
| 7,390,142 B2 | 6/2008 | O'Brien |
| 7,524,142 B2 * | 4/2009 | Scott ............ A01B 13/00 172/316 |
| 7,685,762 B2 | 3/2010 | Parsons |
| 8,480,332 B2 | 7/2013 | Miller |
| 9,267,620 B2 | 2/2016 | Sjodahl et al. |
| 2003/0123824 A1 | 7/2003 | Tatarka et al. |
| 2005/0074293 A1 * | 4/2005 | Searby ............ E02F 5/08 405/180 |
| 2005/0121017 A1 | 6/2005 | Koike et al. |
| 2006/0039758 A1 | 2/2006 | Leverette et al. |
| 2006/0056917 A1 * | 3/2006 | McCormick ....... E02F 5/101 405/116 |
| 2006/0204187 A1 | 9/2006 | Dofher |
| 2006/0288991 A1 | 12/2006 | Baratta |
| 2007/0286681 A1 * | 12/2007 | Parent ............ E02F 5/101 405/174 |
| 2008/0060631 A1 | 3/2008 | Dofher |
| 2009/0263195 A1 | 10/2009 | Horan et al. |
| 2010/0011628 A1 | 1/2010 | Hall et al. |
| 2012/0328370 A1 | 12/2012 | Gustafsson et al. |
| 2013/0294839 A1 * | 11/2013 | Gustavsson ....... E02F 5/101 405/174 |

FOREIGN PATENT DOCUMENTS

| | | |
|---|---|---|
| DE | 1427699 A1 | 7/1971 |
| DE | 2529285 A1 | 1/1977 |
| DE | 3708360 A1 | 9/1988 |
| EP | 1334790 A2 | 8/2003 |
| EP | 1338495 A2 | 8/2003 |
| EP | 1903362 A1 | 3/2008 |
| FR | 2118025 A1 | 7/1972 |
| FR | 2305872 A1 | 10/1976 |
| FR | 2641297 A1 | 7/1990 |
| GB | 1226958 A | 3/1971 |
| GB | 2031049 A | 4/1980 |
| JP | S5138696 U | 3/1976 |
| JP | S57115514 U | 7/1982 |
| JP | S61152064 U | 9/1986 |
| JP | H072554 U | 1/1995 |
| JP | H10156727 A | 6/1998 |
| JP | 2002084615 A | 3/2002 |
| SU | 687194 A1 | 9/1979 |
| WO | 8900928 A1 | 2/1989 |
| WO | 9935346 A1 | 7/1999 |
| WO | 00/63500 A1 | 10/2000 |
| WO | 2004007223 A1 | 1/2004 |
| WO | 2005008307 A2 | 1/2005 |
| WO | 2006096921 A1 | 9/2006 |
| WO | 2007071065 A1 | 6/2007 |
| WO | 2008134848 A1 | 11/2008 |
| WO | WO 2012064271 A1 * | 5/2012 ........... E02F 5/101 |

OTHER PUBLICATIONS

International Search Report and Written Opinion in International patent application No. PCT/SE2011/000013 dated May 24, 2012.
International Preliminary Report on Patentability in International patent application No. PCT/SE2011/000013, dated May 24, 2012.
International Search Report and Written Opinion in International patent application No. PCT/SE2012/000007, dated May 28, 2012.
International Preliminary Report on Patentability in International Application No. PCT/SE2012/000007, dated May 20, 2013.
International Preliminary Report on Patentability in International Application No. PCT/SE2011/050958, dated Jul. 30, 2013.

* cited by examiner

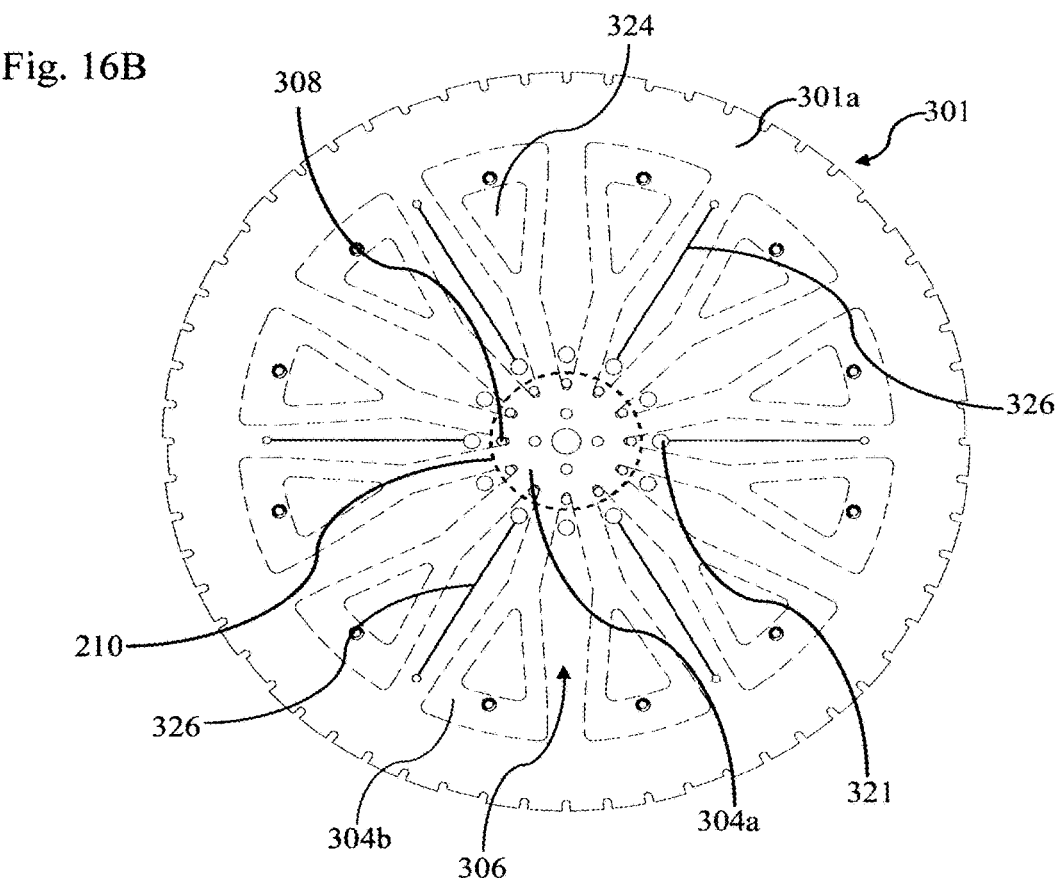

LAYING MACHINE AND A BLADE ASSEMBLY

CROSS-REFERENCE TO RELATED APPLICATIONS

This application is a continuation of U.S. application Ser. No. 13/982,253 filed Jul. 26, 2013, which is a national stage entry of PCT/SE2012/000007 filed Jan. 26, 2012, which claims priority to PCT/SE2011/050958 filed Jul. 21, 2011, which claims priority to PCT/SE2011/000013 filed Jan. 26, 2011, all of which are incorporated herein in their entirety.

BACKGROUND

Several kinds of machine for laying cable, pipes, or the like have been proposed. U.S. Pat. No. 5,214,868, U.S. Pat. No. 5,320,451, U.S. Pat. No. 6,189,244, U.S. Pat. No. 4,326,347, EP 1,058,757, U.S. Pat. No. 6,371,691 and U.S. Pat. No. 6,637,978 are examples of such machines.

U.S. Pat. No. 6,637,978 shows a working machine for laying cable, pipes, or the like. The machine includes an excavation means, a laying means for laying a wire in the excavation and a consolidation means in an intermediate position between the excavation means and the laying means. The width of the excavation being between 5 and 7 cm and the depth between 25 and 50 cm.

OBJECT OF THE INVENTION

An object of the invention is to provide a laying machine that can make a trench and lay at least one flexible casing or tube, cable or wire in the trench in a cost efficient manner.

Another object is to make as little impact on the environment as possible.

Another object of invention is torn provide a blade assembly suitable for such machines.

SUMMARY OF THE INVENTION

At least one of the objects above is at least partially enabled by a laying machine for laying at least one flexible casing or tube, cable or wire including a blade arrangement for making a trench in the ground, a consolidation and laying means being arranged behind the blade, for clearing and safeguarding the trench from collapsing while laying at least one flexible casing or tube, cable or wire into the trench. Having a blade arrangement to cut a trench provides a narrow trench which requires less energy to make than a wider one.

Furthermore, the narrow trench make less damage on e.g. a road and therefore provides less environmental impact than a wider one. Furthermore it can much easier be covered and made almost invisible as if no trenching had been performed. Furthermore using a blade arrangement in a cutting operation makes the side walls of the trench less likely to collapse, since larger stones or roots are cut through. Furthermore the material from the trench when using a blade arrangement becomes a fine dust which can be easily collected by a dust collector.

A blade arrangement in the form of a blade assembly for working on a work surface/area/structure is also suggested. The blade assembly including at least two blades, a first blade, a second blade, and possible a third blade, that are axially aligned, each blade having a working portion at the periphery of the blade and a central portion around the axial center of the blade for being operated on by a device for driving the blade assembly, a blade support structure extending between the working portion and the central portion characterized in that the blades are spaced apart by a spacer structure/s said spacer structure/s forming at least one compartment, between the blades, that is in contact with the central portion and extending towards the working portion, and at least at one radius of the spacer structure/s covering a significant part of the periphery at that radius of the spacer structure/s, said compartment/s having an inlet at the central portion.

Preferably the blade assembly includes three blades which are spaced apart by two spacer structures, said spacer structures each forming at least one compartment between the blades in contact with the central portion and extending towards the working portion and at least at one radius of the spacer structures covering a significant part of the periphery at that radius of the spacer structures, said compartment/s having an inlet at the central portion.

Preferably the significant part is at least 30%, preferably at least 50%, more preferably at least 70% of the periphery.

Furthermore blade assembly for working on a work surface/area/structure is also suggested, including at least two blades, a first blade, a second blade, and possible a third blade, that are axially aligned, each blade having a working portion at the periphery of the blade and a central portion around the axial center of the blade for being operated on by a device for driving the blade assembly, a blade support structure extending between the working portion and the central portion characterized in that the blades are spaced apart by a spacer structure/s, including a central hub that provides support at the central portion, and a plurality of fan blade shaped supports that provides support at the blade support structure and functions as fan blades, said blade assembly having at least one air vent of at least one or possible both outermost blades, said air vent being within the first fractional third of the blade radius. Preferably the blade assembly further having at least one fluid inlet is provided at the central portion.

BRIEF DESCRIPTION OF THE DRAWINGS

FIG. 16B shows a side view of blade of the blade assembly of FIG. 15 having radial extending slots.

DESCRIPTION OF THE INVENTION

Figure 1:
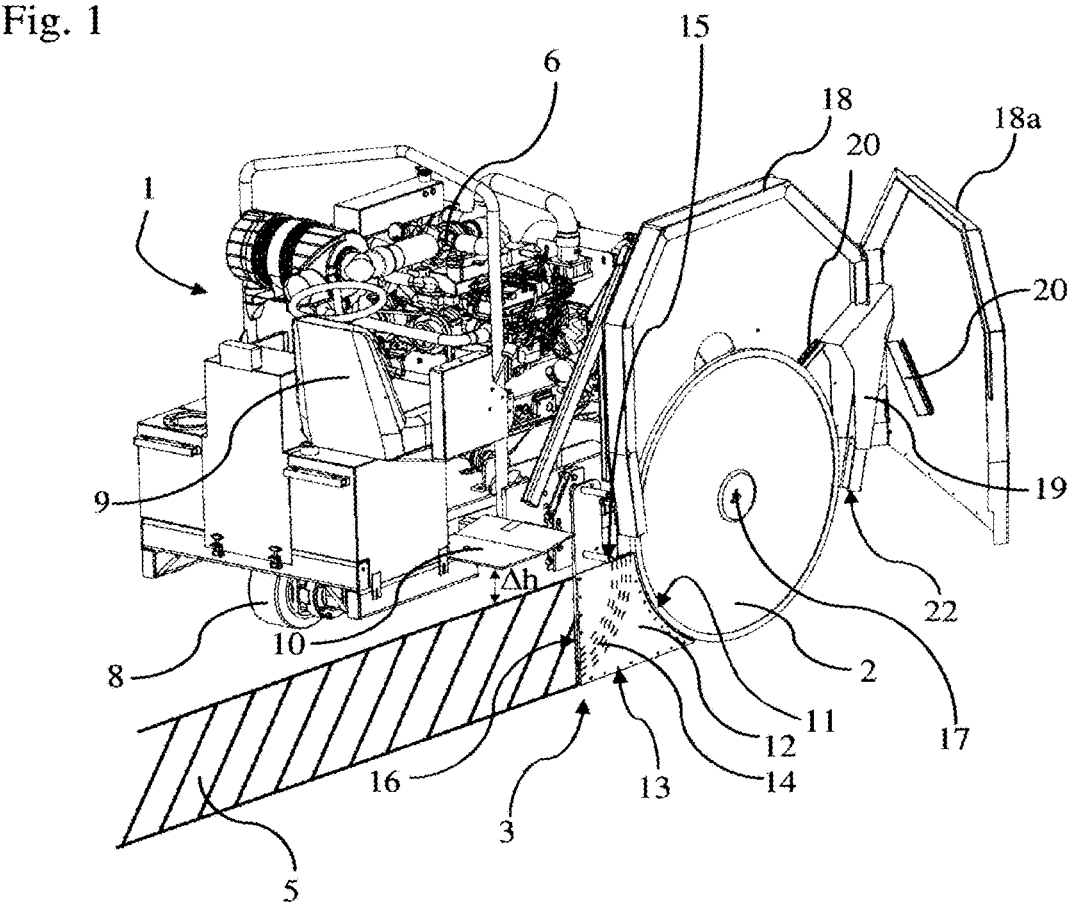
FIG. 1 is a rear perspective view of the laying machine.
Figure 2:
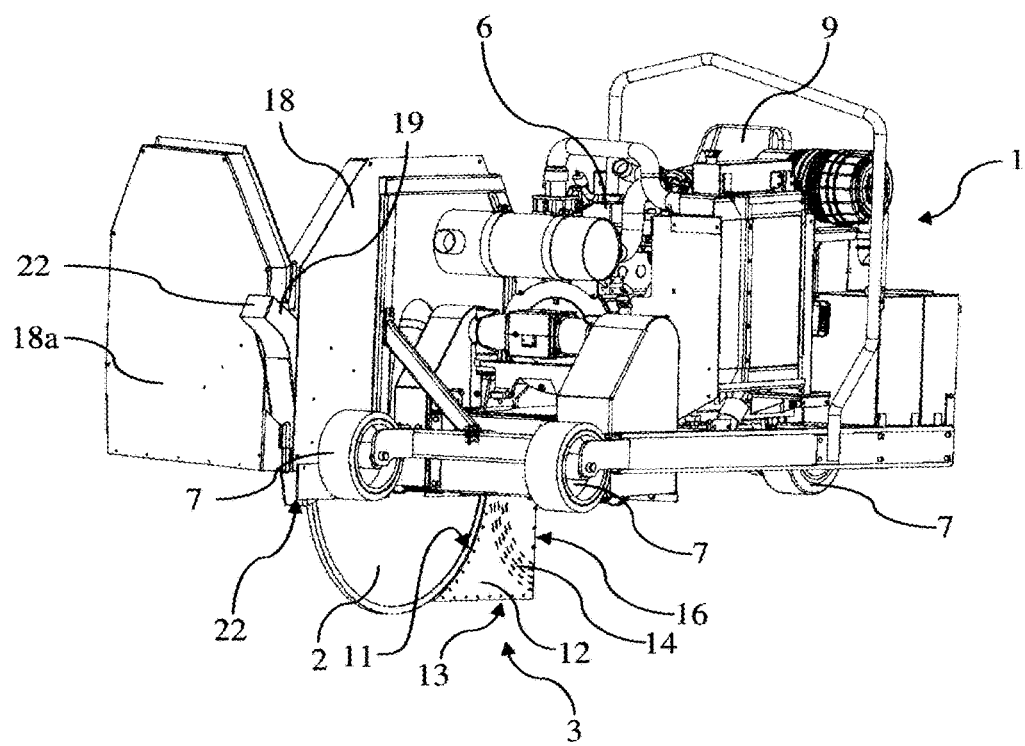
FIG. 2 is a front perspective view of the laying machine.
Figure 3:
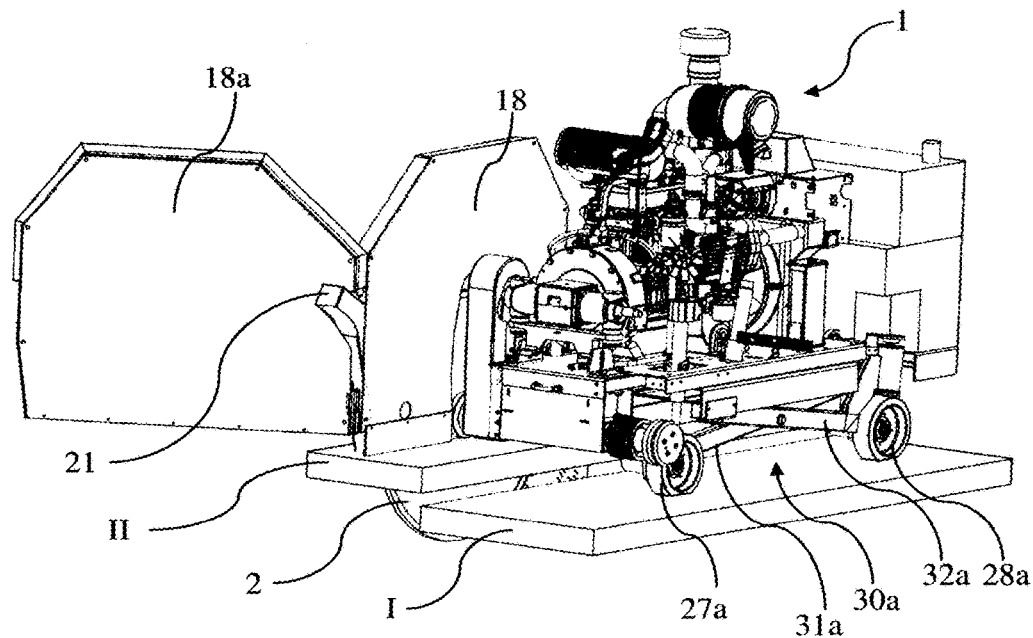
FIG. 3 is a front perspective view of a laying machine being able to operate at different ground levels.
Figure 4:
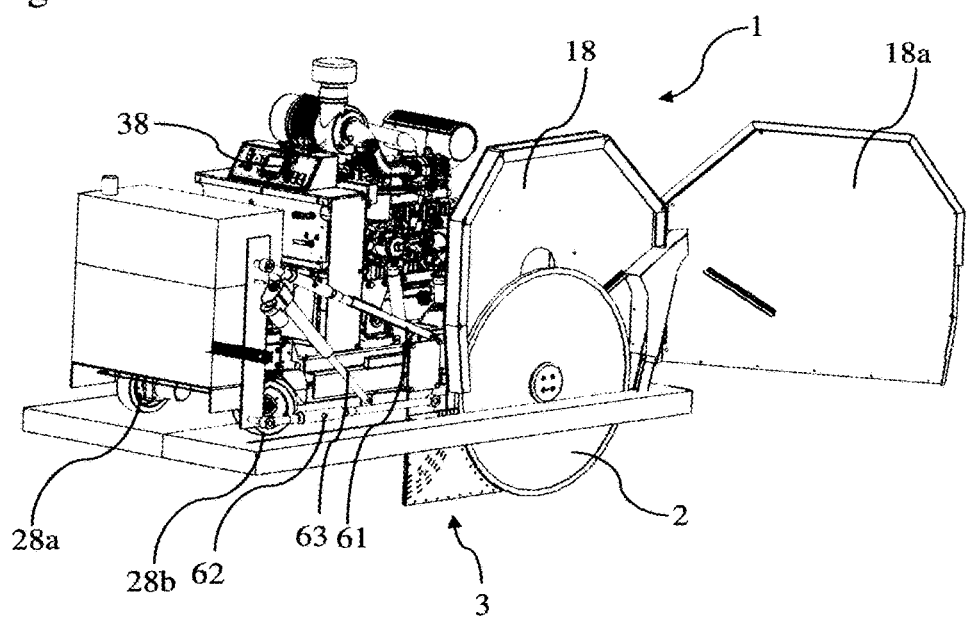
FIG. 4 is a rear perspective view of a laying machine being able to operate at different ground levels.
Figure 8:
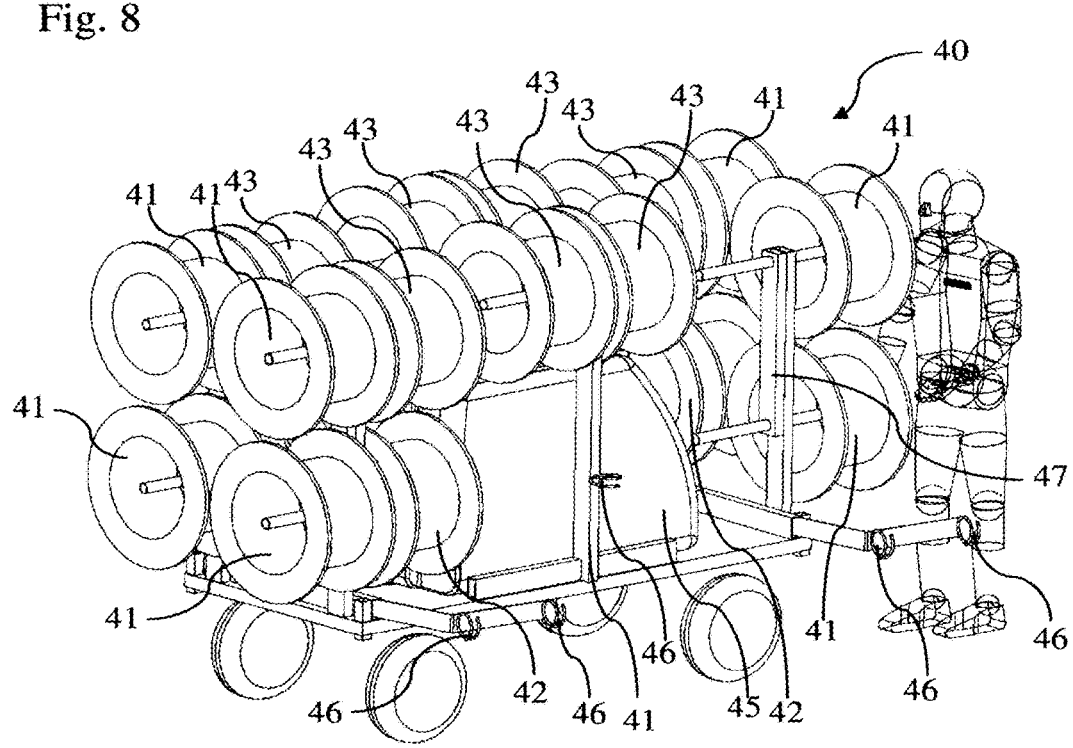
FIG. 8 is a reel carriage which for supplying flexible casings or tubes, cables or wires to the laying machine.

FIG. 1-2 shows a laying machine 1 according to one embodiment and FIG. 3-4 show the laying machine 1 according to another embodiment. The laying machine 1 includes a blade arrangement 2 for making a trench 5 in the ground and a consolidation and laying means 3 for clearing and safeguarding the trench 5 from collapsing while laying at least one flexible casing or tube, cable or wire into the trench 5. The at least one flexible casing or tube, cable or wire can be rolled off from a reel/s mounted on the machine 1 or as shown in FIG. 8 from reels arranged on a reel trailer 40. A disc guard 18 covers the portion of the blade arrangement 2 that is above ground level.

The machine 1 shown in FIG. 1-2 has two front wheels 7 and a rear wheel 8, while the machine shown in FIG. 3-4 has two front wheels 27a, 27b and two rear wheels 28a, 28b which are suspended by two scissor mechanisms 30a; 30b as is described in relation to FIG. 3-6. A motor 6, preferably a diesel engine, provides power to propel the machine 1. The motor is also responsible for rotating the blade arrangement 2, preferably through a belt transmission (not shown).

The blade arrangement 2, the disc guard 18, and the consolidation and laying means 3 are mounted at a first side of the machine 1, here shown as the right hand side of the machine 1. This enables the operator to place the trench 5 close to side structures such as walls. The blade arrangement 2 and the consolidation and laying means 3 can be moved from the first side of the machine to the opposite second side (i.e. the left hand side). When changing sides, the disc guard 18 is replaced by a corresponding disc guard having a mirrored configuration.

In the embodiment of FIG. 1-2 a seat 9 and feet support 10 are provided in the rear of the machine 1 straight behind the blade arrangement 2 so that a seated driver can drive the machine 1 while closely monitoring and controlling the trench making, consolidation and laying operation. In the shown embodiment the seat 9 and the feet support 10 protrudes somewhat more to the right than the blade arrangement 2 with the disc guard 18 and the consolidation and laying means 3, which will somewhat limit how close the machine 1 can make a trench 5 along a wall. However, it would of course be possible to have a driver seat 9 which does not protrude farther than the blade arrangement 2 with the disc guard 18 and the consolidation and laying means 3. Such an embodiment may however reduce a seated operator's ability to visually monitor the trench making operation. The clearance Ah between the ground and the feet support 10 is suitable around 20-30 cm. This enables the machine 1 to go very close to lower side structures such as a pavement along a road. The laying machine 1 may also be arranged to be arranged to be controlled wireless so that the operator can choose between seated operation and remote controlled operation.

In the embodiment of FIGS. 3 and 4, the machine 1 is not equipped with and driver seat. In this embodiment the operator can operate the machine 1 by walking directly behind it accessing the control panel 38 and/or by using a remote control (not shown) for wireless control of the machine 1. In this embodiment the blade arrangement 2 with the disc guard 18 and the consolidation and laying means 3 are arranged as the outermost units of the first side of the machine 1, enabling the machine 1 to go very close also to higher side structures such as walls.

The machine preferably uses a hydraulic propulsion system powered by a diesel engine, however other kinds of propulsion system and motors 6 can be employed. The blade arrangement 2 is preferably driven by the same motor 6 that propels the machine 1 (the motor can e.g. be the same as used in the road saw model Husqvarna RS 8500 D or the floor saw model FS 9900 D). However, it would of course be possible to use separate motors for the blade arrangement 2 and the propulsion of the machine 1, as well as other motors types than those exemplified with. Preferably the motor 6 drives a hydraulic pump that supplies hydraulic fluid to hydraulic motors 71 (see FIGS. 5 and 6) at each wheel 27, 28 based on operator inputs. The shown rear wheels also have hydraulic motors 72 for turning.

The motor 6 drives a shaft 17 that connects to the centre of the blade arrangement 2. The shaft 17 with the blade arrangement 2 can be moved upwards and downwards to adjust the cutting depth of the trench 5. The raising and lowering of the shaft with the blade arrangement 2 is preferably powered by the hydraulic system (not shown) that is powered by the motor 6. In its most upward position the blade arrangement 2 is above ground level, i.e. it is in a transport position, and in its most downward position the shaft 17 holding the blade arrangement 2 is moved to a position close to the ground, e.g. only a few centimeters from ground level. The maximum trench depth can therefore be made almost as deep as the radius of the blade arrangement 2. Depending on how the machine 1 is configured, different blade diameters can be used; preferably the blade diameters are between 500-1200 mm. In one embodiment the blade arrangement 2 can be lowered or raised to any position between these extremes, i.e. the trench depth can thereby be varied. In another embodiment the machine 1 has one or several fixed operating depths.

The working portion, i.e. the active portion at the periphery of the blade arrangement 2, is between 5-50 mm thick, preferably 5-30 mm, more preferably 10-25 mm, most preferably 15-25 mm. Thereby a thin trench can be cut, which requires less work to make than a thicker one. The blade arrangement 2 is preferably of a kind used for floor saws and road saws including one saw blade or an assembly of two or more saw blades, preferably two or three saw blades (see e.g. the embodiment described in relation to FIG. 11-14). The saw blade/s comprise steel plate/s that preferably has diamond-impregnated segments at the periphery (working portion) of the blade. Steel plates having diamond-impregnated segments at the periphery are for instance sold by Husqvarna AB.

As can be seen in FIG. 1 the disc guard 18 includes a hinged lid 18a that can be opened to access the blade arrangement 2. When closed the disc guard 18 has a width slightly larger than the width of the blade arrangement 2. In the preferred embodiments the blade arrangement 2 is arranged to rotate in an upcut direction, i.e. a rotational direction where the lowest portion of the blade arrangement 2 moves in the forward driving direction of the machine 1. Therefore, dust and any debris from the trench making, consolidation and laying operation will mainly exit the trench in front of the blade arrangement 2. To collect this dust and debris dust duct 19 is provided in the front section of the disc guard 2. The dust duct has an dust inlet 22 arranged close to the ground in front of the blade arrangement 2 for receiving dust from the upcut rotation of the blade arrangement 2, and a disc guard dust outlet 21 located above the disc guard dust inlet 22. An upper wall of the disc guard dust duct 19 is partly defined by a flexible sealing member 20 sealing towards the blade arrangement 2 and preventing dust from entering the upper volume of the disc guard 18. The sealing member 20 could e.g. be two rubber strips or two brushes.

Figure 10:
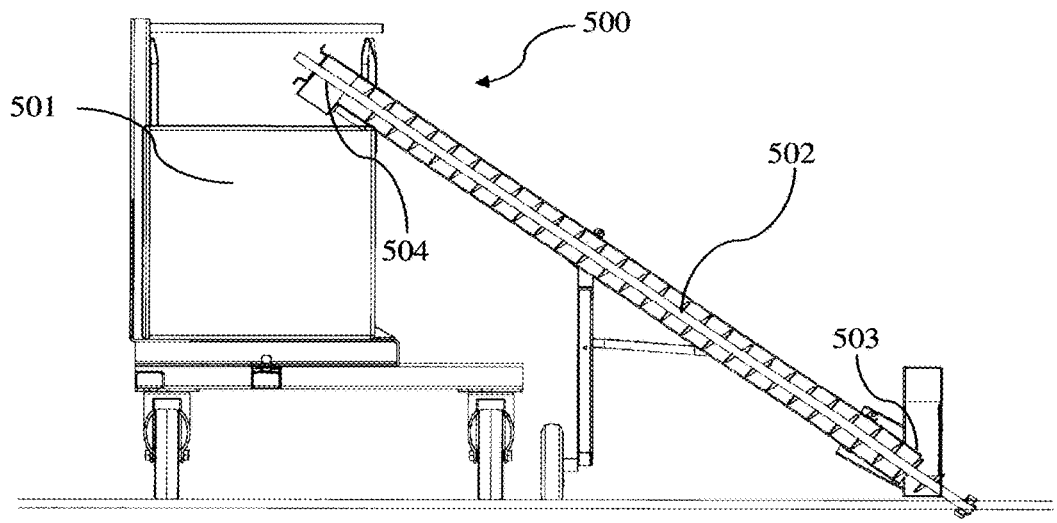
FIG. 10 shows schematically an embodiment of a dust collector.
Figure 11:
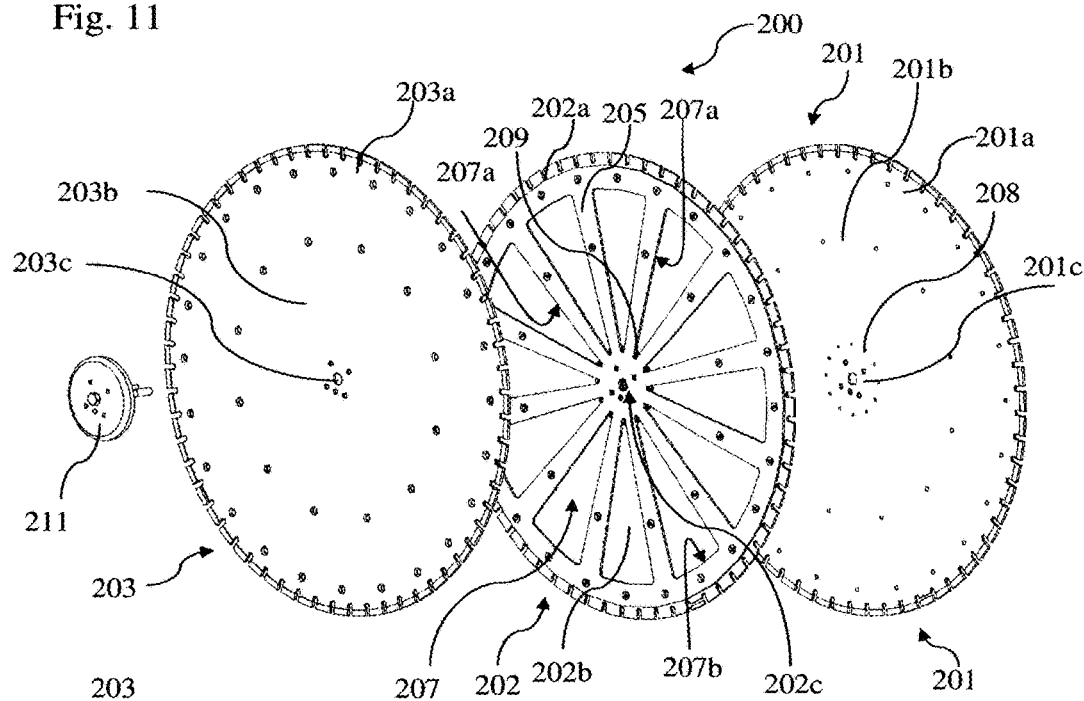
FIG. 11 shows a partial exploded view of a blade assembly having three blades as seen from the side opposite to where the drive shaft is connected.
Figure 12:
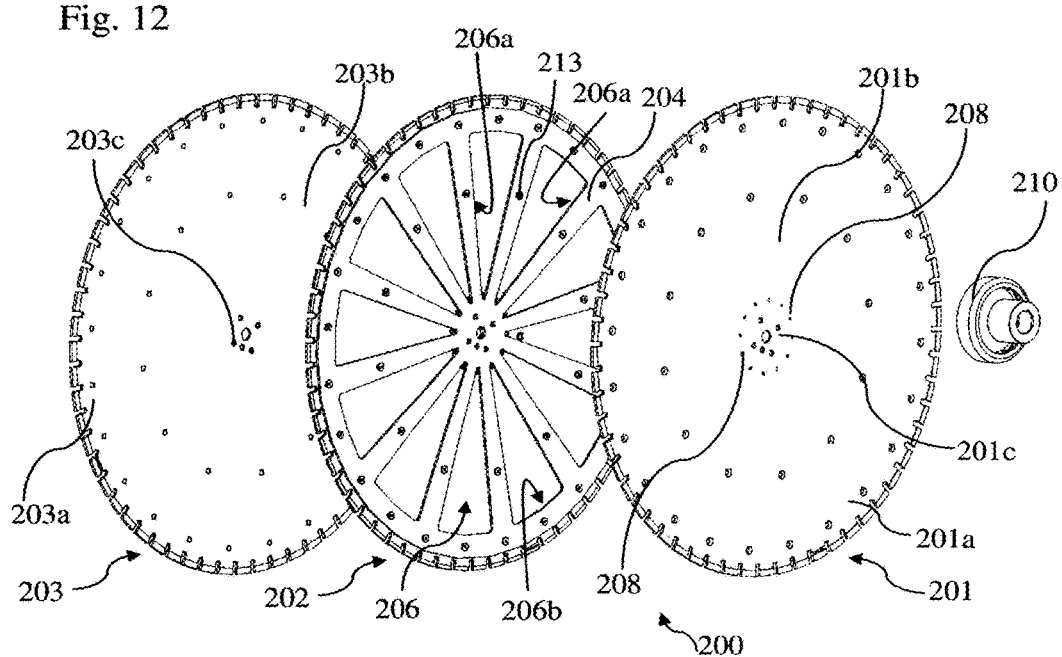
FIG. 12 shows a partial exploded view of a blade assembly having three blades as seen from the side where the drive shaft is connected.
Figure 13:
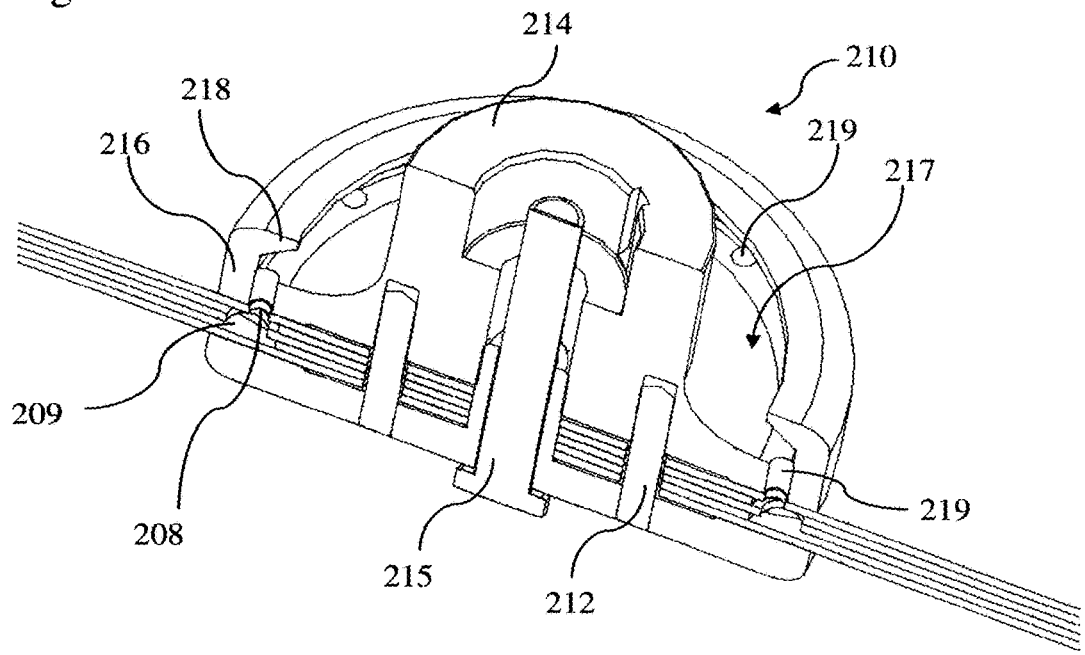
FIG. 13 shows a cross section of the central member clamping the blade assembly, providing a connection for the drive shaft and providing means for supplying fluid to compartments in the blade assembly.
Figure 14:
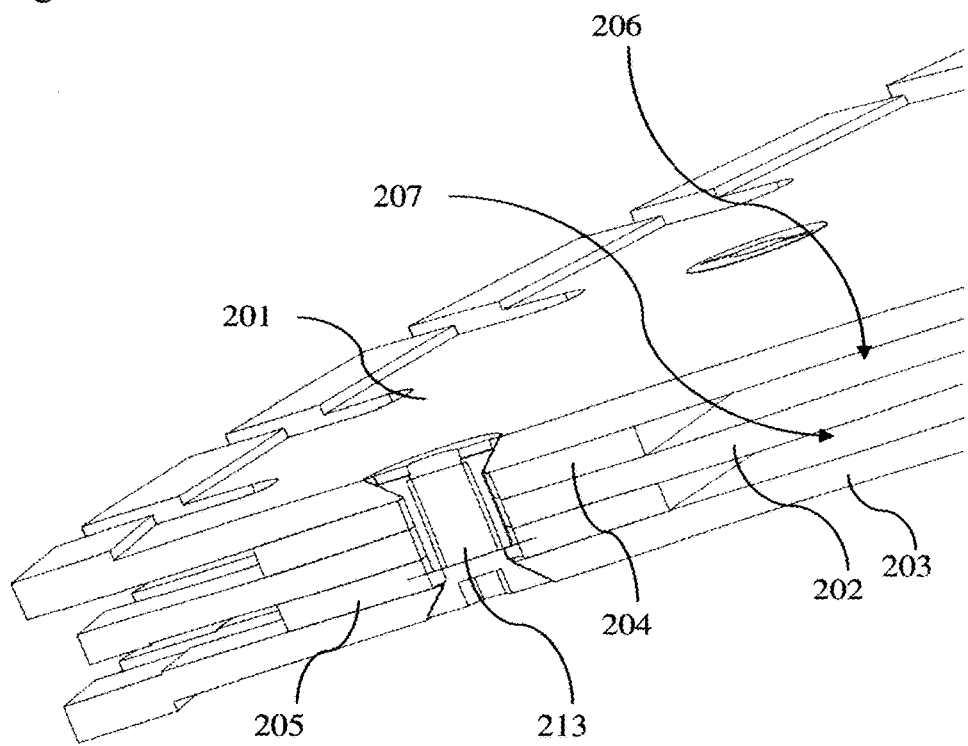
FIG. 14 shows a zoomed in part of a cross section of the blade assembly at the periphery thereof.

A dust collector 50; 500 (see FIG. 7, 9, 10) can be connected to the disc guard dust outlet 21, to receive dust and debris from the trench making operation. The dust collector 50; 500 may include suction means (not shown) or other active means for conveying dust to a receiving compartment of the dust collector, for instance a screw conveyor 501 (see FIG. 10), or it may rely only on the rotational force from the rotating blade arrangement 2 (See FIG. 7). The dust collector 50; 500 can include any kind of container or a bulk bag (e.g. a Flexible Intermediate Bulk Container), that can be arranged on the machine 1 or on a separate wheeled unit.

Figure 7:
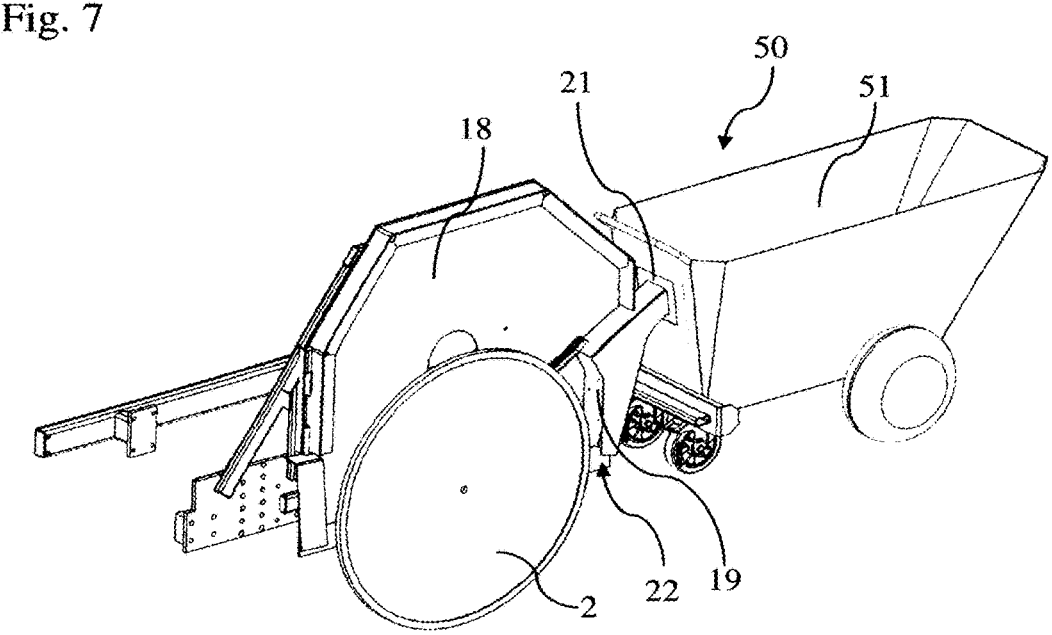
FIG. 7 is a perspective view of a wheeled dust collector being pushed by the laying machine.

In the embodiment shown in FIG. 7 the dust collector is a first wheeled unit 50 in front of the machine 1 that is pushed forward by the machine 1 as it propels. The first wheeled unit 50 of FIG. 7 has an inner compartment 51 which is preferably covered by a lid (not shown) during the trench making operation. The inner compartment 51 is connected to the dust outlet 21 via an opening to the inner compartment 51 at the rear side thereof. The dust duct 19 and the inner compartment 51 of the first wheeled unit 50 forms a substantially closed air system which optionally has an air filter for letting out air while keeping the dust in the compartment 51. If having an air filter it is preferably arranged on the lid (not shown). The first wheeled unit 50 is easily disconnected from the laying machine 1 so that moved away and emptied when filled.

Figure 9:
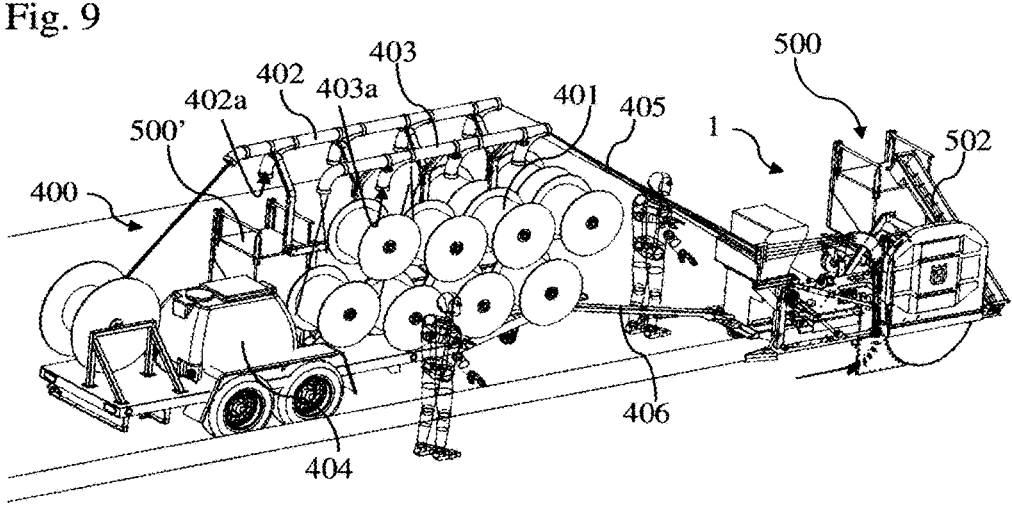
FIG. 9 shows laying machine in operation pulling a reel trailer that supplies flexible casings or tubes, cables or wires to the machine.

In FIG. 9, 10 the dust collector 50; 500 is a second wheeled unit 500 that supports a bulk bag 501. Here the wheeled unit 500 is shown arranged at the left side of the machine, i.e. the side opposite to where the blade arrangement 2 is mounted. A screw conveyor 502 has a screw conveyor inlet 503, in a lower distal end thereof, which receives dust from an dust outlet in front of the disc guard 18, and conveys the dust to the screw conveyor outlet 504 at the opposite distal end of the screw conveyor 502 that supplies the bulk bag 501 with the conveyed dust. When a bulk bag is full, the second wheeled unit 500 can be replaced by another second wheeled unit 500', and/or the bag can be removed from the second wheeled unit 500 and optionally emptied at a suitable location. Even though the embodiment in FIG. 9, 10 shows a screw conveyor 502 for conveying the dust to the bulk bag 501, other kinds of conveying means can be employed, for instance a belt conveyor.

In the embodiment of FIGS. 1 and 2 the consolidation and laying means 3 is manually put into the trench and secured at the operating depth. In this embodiment, when making a trench 5, the laying machine 1 first makes an initial trench with the blade arrangement 2. In this initial step the consolidation and laying means 3 is detached from the machine 1. When the initial trench 5 has been made the blade arrangement 2 is raised, and the consolidation and laying means 3 is inserted into the trench 5, preferably already supporting the at least one flexible casing or tube, wire or cable. Alternatively the at least one flexible casing or tube, wire or cable can be provided to the consolidation and laying means 3 while in the trench 5. Thereafter the consolidation and laying means 3 is secured to the laying machine 1 and the blade arrangement 2 is lowered to the operating depth.

In the embodiment shown in FIG. 4 it can be seen that the consolidation and laying means 3 is being held by two pivotable arms 61, 62. Each arm 61, 62 include a turnbuckle so that their respective length can be adjusted by turning the turnbuckles. Thereby the position of the consolidation and laying means 3 behind the blade arrangement 2 can be adjusted. Furthermore, the pivotable arms 61, 62 are so arranged that, when lifting the consolidation and laying means 3 up from the trench 5 while the disc blade arrangement 2 still is present therein, it follows a trajectory that prevents the consolidation and laying means 3 from intersecting with the blade arrangement 2 when being raised or lowered into the trench 5. An actuator 63 can be actuated to raise and lower the consolidation and laying means 3. The actuator 63 can e.g. be a hydraulic actuator connected to the hydraulic system of the machine 1 or an electric actuator. The operator can control the raising lowering of the consolidation and laying means 3 via the control panel 38 on the machine or via remote control (not shown).

When reaching the operating depth the concave front end 11 of the consolidation and laying means 3 is arranged to be located behind the blade arrangement 2, at a position so that the concave front end faces and follows the periphery of the blade arrangement 2 and so that the clearance between the front end 11 and the blade arrangement 2 is less than 50 mm within the trench 5. Preferably the clearance is less than 40 mm, more preferably less than 20 and most preferably less than 10 mm. In fact the clearance could even be zero the first time it is used letting the blade arrangement 2 work up a clearance. Of course as the blade arrangement 2 is worn the clearance may increase. The consolidation and laying means 3 could therefore be equipped with clearance adjusting means for adjusting it forwardly and backwardly to adjust the clearance between the front end 11 and the periphery of the blade arrangement 2.

Furthermore, when arranged behind blade arrangement 2, i.e. during the trench making, consolidation and laying operation, the lowest portion of the consolidation and laying means 3, i.e. its bottom 13, is arranged to be located above the lowest portion of the blade arrangement 2, preferably between 10-100 mm above, more preferably 10-60 mm, most preferably 20-50 mm. Preferably the bottom 13 is not leveled but continuously or sequentially increasing the clearance to the bottom of trench 5 when moving from the front of the consolidation and laying means 60 to the rear of it.

The side walls 12 of the consolidation and laying means 3 prevents the trench walls from partly or completely collapsing before the at least one flexible casing or tube, cable or wire is fed into the trench 5. The consolidation and laying means 3 further has one or more feeding ducts 14 that each has a inlet at an upper portion 15 of the consolidation and laying means 3 for receiving the flexible casing, cable or wire and a outlet at a rear end 16 of the consolidation and laying means 3 for feeding the cable or wire to the trench 5. Each feeding duct 14 can be arranged to guide one or more flexible casings or tubes, wires, or cables, preferably one flexible casing or tube. Thus the at least one feeding duct 14 can be one, e.g. feeding a larger flexible casing with room for multiple cables, or several tubes, wires or cables on top of each other. Preferably the feeding duct 14 is at least two, preferably at least four. The consolidation and laying means 3 is preferably made open or openable at the upper portion of and towards the rear end of the consolidation and laying means 3, so that the at least one flexible casing or tube, wire, or cable can be fed by pushing it down into the consolidation and laying means 3, i.e. this could be done while it is already in the trench 5. Another alternative is to push the at least one flexible casing or tube, wire, or cable through the inlet of the feeding duct 14 to the outlet of the feeding duct 14. A further option would be to have one of the side walls 12 of the consolidation and laying means 3 detachable, i.e. detaching it and putting the at least one flexible casing or tube, wire, or cable into the desired feeding duct 14.

In one embodiment the consolidation and laying means 3 have the same thickness or is no more than 1 mm thinner than the blade arrangement 2. The advantage with this embodiment is that both the blade arrangement 2 and the consolidation and laying means 3 can be made as thin as possible, i.e. as thin as the size of the flexible casing or tube, cable or wire allows.

Alternatively, the consolidation and laying means 3 is made thinner than the blade arrangement 2, preferably at least 1 mm thinner, more preferably at least 2 mm thinner, most preferably at least 5 mm thinner, even more preferred 10 mm thinner. One advantage of having the consolidation and laying means 3 thinner than the blade arrangement 2, is that if the trench 5 is not to be cut in a straight line but rather allowing for a curvature, the lesser thickness of the consolidation and laying means 3 reduces the risk for it to get stuck in the trench 5, i.e. the more thinner the consolidation and laying means 3 is in relation to the blade arrangement 2, the steeper curves can be done when making the trench 5.

The wire laying machine 1 could further include, a temperature sensor (not shown) for sensing the temperature of the blade arrangement 2, a coolant and/or consolidation liquid supply means (not shown) for supplying liquid to the blade arrangement 2, and means for regulating the amount of supplied liquid (not shown) to the blade arrangement 2 based on inputs from the temperature sensor. The coolant and/or consolidation liquid for either cooling the blade arrangement 2, or consolidating the trench 5 by wetting it thereby reducing risk of partly or entirely collapsing trench walls, or a combination of cooling the blade arrangement 2 and consolidating the trench 5.

Regarding the rotational direction of the disc, even though it is preferred to have upcut direction, the opposite would also be feasible. Of course then the dust inlet and outlet are suitably arranged at the rear end of the blade arrangement 2.

When laying fiber optic cables it is common to put out hollow tubes or flexible casings where the fiber optic cables are blown out using air pressure through already installed tubes and/or casings, i.e. after that the tubes and/or flexible casings have been put down in trenches and been covered.

The laying machine 1 may also include as GPS receiver which saves positional data which can be used in combination with digital maps to document the excavated trenches.

Furthermore the laying machine may also include means for monitoring the cutting depth and to save this information in combination with the positional data. Also information about how many and which kind of flexible casings, tubes, cables or wires that have been laid down in the trenches. Thereby a full documentation can be provided about where the trenches have been excavated, how deep they are, and what kind and how many cables, wires etc that has been laid down in the trenches.

Figure 5:
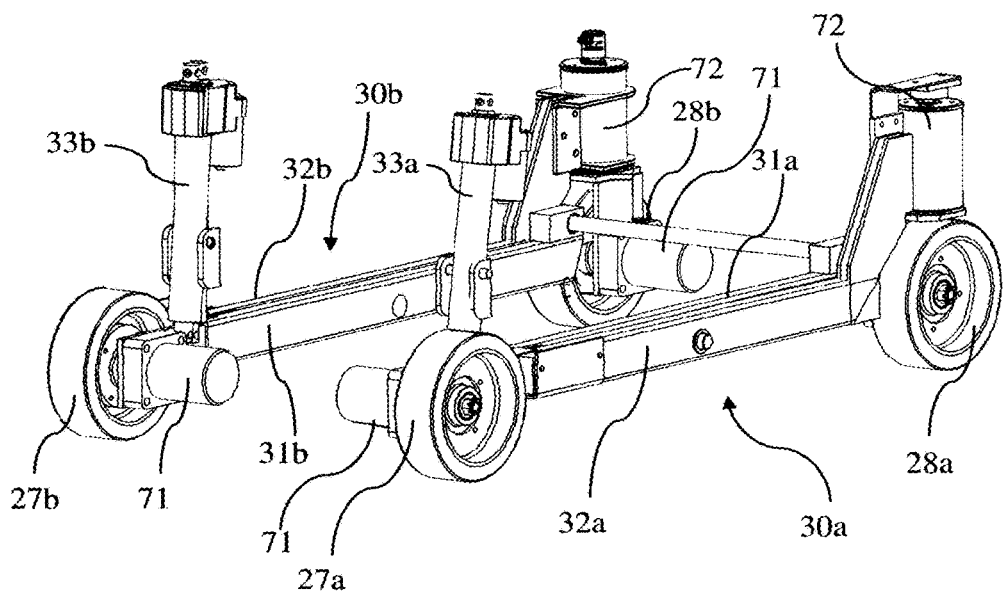
FIG. 5 shows scissor mechanisms used in the embodiments of FIGS. 3 and 4 when both are fully retracted.
Figure 6:
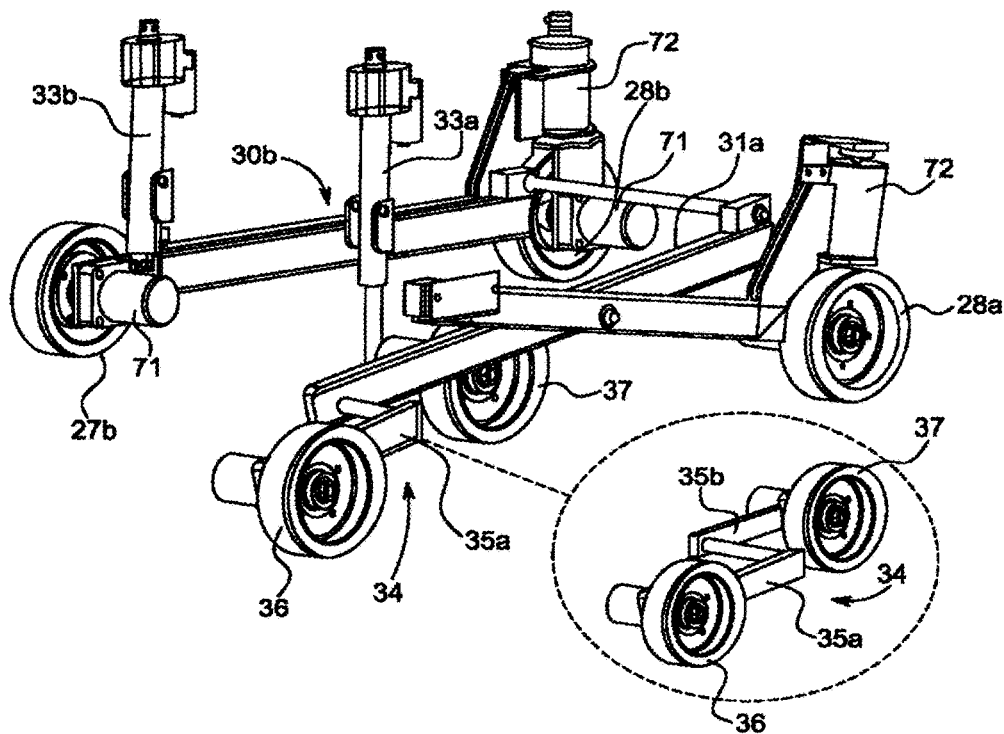
FIG. 6 shows the scissor mechanisms used in the embodiments of FIGS. 3 and 4 when the right one is retracted and the left one extended, and when a front wheel is replaced by a longitudinal boogie.

In FIG. 3-6 an embodiment is shown where the laying machine 1 has a left 27*a*, 28*a* and a right 27*b*, 28*b* wheel pair mounted to a scissor mechanism 30*a*; 30*b* of left and the right side of the machine 1. Respectively scissor mechanism 30*a*; 30*b* having a front scissor arm 31*a*; 31*b* for the front wheel 27*a*; 27*b* and a rear scissor arm 32*a*; 32*b* for the rear wheel 28*a*; 28*b*. The scissor mechanism is best seen in FIGS. 5 and 6. In FIG. 3, the laying machine 1 is shown with the left wheel pair 27*a*, 28*a* on a first ground level I, e.g. street level, and the second wheel pair 27*b*, 28*b* on a second elevated ground level II, e.g. a pavement. An actuator 33*a*; 33*b* actuates the front scissor arm 31*a*; 31*b* when extends or retracts the scissor mechanism 30*a*; 30*b*, and thereby raising or lowering the corresponding side of the machine 1, so that it can operate with the wheel pairs 27*a*, 28*a*; 27*b*, 28*b* on different ground levels while keeping the blade arrangement 2 vertical.

As exemplified in FIG. 6 one wheel 27*a* may be replaced by a bogie arm 35*a*, 35*b* running in an essentially longitudinal direction of the laying machine 1 to form a longitudinal bogie 34 carrying two wheels 36, 37, one at respectively longitudinal end. In this example the two arms 35*a*, 35*b* are fixedly joined by a shaft and the bogie turns around this shaft. It is also possible to replace two wheels 27*a*, 28*a*; 27*b*, 28*b* at one lateral side of the laying machine 1 with a longitudinal bogie 34. When replacing two wheels 27*a*, 28*a*; 27*b*, 28*b* at one lateral side of the laying machine 1, the corresponding scissor mechanism 30*a*; 30*b* is suitably replaced or changed to a height adjusting mechanism affecting the central part of the longitudinal bogie 34. Furthermore if replacing two wheels 27*a*, 28*a*; 27*b*, 28*b* at one lateral side of the laying machine with a single height adjustable longitudinal bogie 34, it is preferred that it is the lateral side opposite to the one carrying the blade arrangement 2, i.e. in the shown embodiment of FIGS. 3 and 4 the wheels 27*a*, 28*a* can be replaced by such longitudinal bogie 34. The two wheels 27*a*, 28*a* of the opposite lateral side may also each be replaced by a corresponding longitudinal bogie 34.

To distribute the pressure from the blade arrangement 2 the wheel 27*b* close to the blade arrangement 2 can be replaced by a longitudinal bogie 34. This can be combined with a single height adjustable longitudinal bogie 34 at the opposite lateral side replacing the two wheels 27*a*, 28*a* of the opposite side. This is the preferred embodiment when employing boogies 24.

Alternatively the wheel 27b close to the blade arrangement 2 can be replaced by a longitudinal bogie 34, and a single longitudinal boogie 34 replaces the rear wheel 28a at the opposite lateral side, or two longitudinal boogies 34 are respectively replacing the two wheels 27a, 28a of the opposite side.

Preferably in all embodiments at least one of the wheels 27a, 28a, 27b, 28b is not replaced by a longitudinal boogie 34. The at least one remaining wheel can preferably be used when turning the machine as well as driving the machine. Preferably at least one of the wheels 27a, 28a, 27b, 28b that is not replaced by a longitudinal boogie is the rear wheel 28b of the side carrying the blade arrangement 2. Replacing wheels 27a and 28a with one longitudinal bogie 34 and wheel 27b with one longitudinal bogie 34 creates an especially efficient solution where the machine is always supported in three positions. Preferably only the bogie wheels close to the saw blade are driven. Alternatively also the rear wheel 28b is driven. Its main function is however for steering.

The actuators 33a; 33b are preferably hydraulically powdered cylinders that each are connected to a corresponding hydraulic scissor control valve (not shown). Of course, the actuators 33a; 33b can alternatively be electrical actuators. The laying machine 1 has a first level sensor (not shown) which measures the angle to horizontal in a sideways direction.

The first level sensor is connected to an electronic control unit (not shown) that can be set to control the hydraulic scissor control valves (not shown) and thereby the scissor mechanisms 30a; 30b. Thereby the machine 1 can be automatically controlled to stay leveled in horizontal position, so that the blade arrangement 2 is kept vertical. The first level sensor may also provide leveling information to the operator.

In one embodiment the first level sensor can be calibrated. In this situation the operator uses a reference level sensor and inputs the results either manually using the control panel 38 or a remote control device or by connecting the reference sensor to the electronic control unit (i.e. via cable or wireless, for instance via an usb cable to the control panel). The reference senor may be connected to a computer running a calibrating software. A calibrating software may also be included in the electronic control unit.

In one embodiment the operator can choose to set one of the scissor mechanisms 30a; 30b in a fixed position. Thus in this situation the electronic control unit is adjusting the horizontal leveling by extending or retracting the opposite scissor mechanism 30b; 30a. Usually the scissor mechanism 30a; 30b on the side where the blade arrangement 2 is located is set in a fixed position. Thereby the cutting depth can be kept constant.

In addition the operator can choose to switch off the automatic leveling control and instead manually control one or both hydraulic scissor control valves. Of course, the machine could be arranged without an automatic leveling system relying only on manual control of the hydraulic scissor control valves.

By having the scissor mechanisms 30a; 30b, the flexibility of the laying machine 1 increases. The machine 1 can operate with one wheel pair 27a, 28a at one ground level I and the opposite wheel pair 27b, 28b on a different ground level II, for instance by having one of the wheel pairs on a pavement. Also the ground clearance of the machine can be adjusted, e.g. by extending/retracting both scissor mechanisms 30a; 30b. This can be advantageous if the ground is somewhat uneven, e.g. with stones sticking up. Furthermore if one wheel 27a, 27b, 28a, 28b encounters a bump or a small hole, both the consolidation and laying means 3 and the blade arrangement 2 can be kept from tilting left or right, by extending or retracting the scissor mechanisms 30a; 30b, i.e. minimizing the risk of them getting jammed in the trench.

In the embodiment shown in FIG. 3-6, the front wheels 27a, 27b and the rear wheels 28a, 28b are hydraulically driven. The rear wheels 28a, 28b can be jointly turned, up to 90 degrees by use of hydraulics, or be tuned individually, whereas the front wheels 27a, 27b in this embodiment are fixed from turning. Each rear wheel 28a, 28b have an angle sensor for determining the angular position of respectably rear wheel. The angular sensors can be individually calibrated by the operator. This calibrating feature can also allow manufacturing to have slightly less accuracy when mounting the sensors, since they can be calibrated after manufacture.

As mentioned above the machine can be operated from a control panel 38 on the machine 1 or by a remote control device. Each scissor mechanism can be individually extended or retracted. The machine 1 can be set for automatic leveling or manual leveling, with or without fixing one of the scissor mechanisms 30a; 30b in one position and adjusting the other. The rear wheels 28a, 28b can be turned individually or jointly. All these features provides for great flexibility.

The steering control of the machine 1 can at least be set in a transport mode or in a cutting mode. If the blade arrangement 2 is in an operating position in the trench 5, the steering control acts differently compared to when in the transport mode. For instance the angular position of the rear wheels are limited, e.g. +−10 degrees compared to +−90 degrees in transport mode. In transport mode the angular position of the wheels are proportional to the joystick or steering wheel position, i.e. the wheels will revert to 0 degrees if the joystick is released, whereas in cutting mode moving a joystick position gives inputs to slowly turn the wheel in one rotational direction, turning speed determined by how much the joystick position is offset (optionally the turning speed of the wheel is constant regardless of how much the joystick is offset). If the joystick is released the wheels stay in their latest position. In the cutting position the forward speed is also limited, for instance a full joystick offset could provide a speed that is only a third of the speed in transport mode. When raising the blade arrangement 2 from the trench 5, the steering control is kept in the cutting mode until it is deactivated. One advantage with this is that the blade arrangement 2 can be switched while keeping the wheels in the same position. This is very beneficial since normally the wheels are slightly turned in operating conditions, even if the machine 1 is intended to go straight forward. This is done to compensate for the forces that arises due to that the blade is positioned at one side of the machine 1.

Another feature of the steering control is that, when starting the motor the joystick must be in neutral position to be able to be activated, so the machine will not move when the joystick is activated.

There is a sensor measuring the strain on the flexible casing, wires, cables, etc. and that stops forward propulsion regardless of joystick input, if a predetermined threshold is succeeded. The machine 1 can provide information to the operator before this threshold has been reach, for instance be signaling with a green color if there is no or little tension, orange if the tension is closer to critical, and red if the machine is about to stop forward propulsion.

In one embodiment there is provided a fluid pressure sensor that stops the rotation of the blade arrangement 2 if the fluid pressure is lost.

In an alternative embodiment each wheel 27a, 28a, 27b, 28b has an individual raising/lowering mechanism, automatically controlled by an electronic control unit (not shown) and/or by the operator. Thereby the laying machine 1 can easily adapt to height changes in the ground level. By having the ground clearance between the main body of the machine 1 and wheels 27a, 28a, 27b, 28b individually controlled the blade arrangement 2 and the consolidation and laying means 3 cannot only be kept from tilting to the left or right when driving on different levels, such as pavement vs. street, or when encountering bump or holes, but they can also be kept from tilting forward or backward if e.g. one of the front wheel drives over a bump.

FIG. 8 shows a reel trailer 40 which is suitably pulled by the laying machine 1. The reel trailer 40 supplies flexible casings, tubes, cables or wires to the laying machine 1 and is equipped with a plurality of reels 41, 42, 43 each being initially fully winded with a flexible casing, tube, cable or wire. The trailer also has a coolant/consolidation liquid tank 45 for supplying liquid to the laying machine 1 for cooling the blade arrangement 2 and/or consolidating the trench 5. From the cable reels 41-43, cables are guided via the guiding members 46 towards the laying machine in front of the trailer 40. The shown embodiment being able to hold 20 reels; i.e. enabling the laying machine 1 to lay up to 20 flexible casings, tubes, cables or wires in the trench. The outer reels 41 are easily accessed and can hence easily be replaced when empty. To change the upper inner reels 43, a central bar 44 at each side of the trailer 40 which holds a pair of upper inner reels 43 can be displaced forward respectively rearward to provide enough space for removal of an upper inner reel 43. The lower inner reels 42, hanging in front of the coolant/consolidation liquid tank 45, are each arranged on a pivotable arm 47 (in the shown embodiment there is in total four pivotable arms 47). By pivoting the arm 47 outwardly a lower inner reel 42 can be replaced.

In FIG. 9 a laying machine 1 is pulling a second reel trailer 400, according to another embodiment. A dust collector 500 is also connected to the laying machine 1 collecting dust from the laying machine 1. The reel trailer includes a plurality of reels 401 having their axis transversal to the driving direction, which makes it easy to roll of flexible casings, tubes, cables or wires 405. The flexible casings, tubes, cables or wires 405 are guided by an overhead guiding system 402, 403 including two horizontal tubes, a left hand tube 402 and a right hand tube 403, above the reels 401 and extending in the driving direction. Each tube has several inlets 402a, 403a to the tube and the tube guides the wires towards the laying machine 1. The laying machine 1 is connected to the reel trailer 400 by a rod, with one flexible joint at each end. The reel trailer 400 also includes a fluid tank 404, that supplies fluid through a hose that is guided in the left hand tube 402. Also seen in the figure is a full dust collector that has been disconnected from the laying machine in favor of a new and empty dust collector 500.

FIG. 11-14 shows a blade arrangement in the form of a blade assembly 200, according to one embodiment, that is suitable for cutting a trench with the laying machine 1. The blade assembly 200 includes an inner first blade 201 and intermediate second blade 202 and an outer third blade 203.

Each blade 201;202; 203 having a working portion 201a; 202a; 203a at the periphery of the blade and a central portion 201c; 202c; 203c around the centre of the blade, and a blade support structure 201b; 202b; 203b extending between the working portion 201a; 202a; 203a and the central portion 201c; 202c; 203c.

The blades are preferably steel plates having diamond-impregnated segments at the periphery. The total thickness of the blade assembly 200 at is periphery is preferably 15-30 mm, more preferably 15-25 mm. The diameters of the first and third blades are preferably in the range 500-1200 mm. The second blade 202 can be of equal diameter or up to 100 mm shorter. The thickness of the blades is preferably in the range of 2-10 mm, more preferably 3-5 mm. The thickness of the segments is preferably in the range of 3-12 mm, more preferably 3.5-6 mm. The thickness of the segments of the intermediate second blade 202 may be thinner than those of the outer blades, e.g. 0.2-1 mm thinner.

A first spacer structure 204 is arranged between the first blade 201 and the second blade 202, and a corresponding second spacer structure 205 is arranged between the second blade 202 and the third blade 203. The spacer structures 204, 205 are of flat circular shape with a plurality of radially extending triangular shaped holes that are evenly distributed around the centre of the spacer structure 204, 205. The holes in the spacer structures 204, 205 provide a plurality of compartments 206, 207 together with the two neighboring blades 201,202; 202, 203, a plurality of first compartments 206 between the first and second blade and a plurality of second compartments 207 between the second and third blade. The segments of the spacer structures 204, 205 that enclose the holes provide the side walls 206a, 206b; 207a, 207b of the compartments and the two neighboring blades 201,202; 202, 203 provides the axial walls.

Each compartment 206, 207 has two radial extending side walls 206a, 207a that both extends radially from a predetermined distance from the axial center of the blades, preferably within 150 mm from the center. The two radial extending sidewalls 206a; 207a of compartment 206, 207 are preferably of equal length. The compartments 206, 207 have a third side wall extending between the two side walls defining the outer edge of the compartments 206, 207. The third side wall is located at a distance closer to the periphery of the blades 201, 202, 203 than to the center of the blades, preferably within 200 mm from the periphery. The third side wall is preferably straight or concave.

The number of compartments between two neighboring blades should be at least one, preferably the number is in the range of 3-20, more preferably 7-15. In the shown embodiment the number is 12. For cooling purposes, the area that the spacer structure covers on the blade is preferably as large as possible. However, the spacer structure also functions as supporting and stabilizing structure. Therefore the area that the spacer structure covers is preferably 15-80% of the area of the outer blades, preferably 20-70%, more preferably 25-50%.

The spacer structure is preferably a disc made of steel. However other materials could be used. For example the spacer structure may be made of aluminum or other metals or alloys thereof. It may also be made in a polymer material. The thickness of the spacer structure, for a blade having a diameter in the range of 500-1200 mm, is preferably in the range of 2-10 mm, more preferably 3-6 mm.

A plurality of first bores or first inlets 208, one for each first compartment 206, perforates the first blade 201 to reach each of the first compartments 206 at or close to the intersection of its two radial extending sidewalls 206b, i.e. at a position close to the centre of the blades. The second blade 202 have a plurality of second bores or second inlets 209, one for each second compartment 207, that each are positioned to extend from the first compartments 206 at or close to the intersection of its two radial extending sidewalls 206b, i.e. opposite to the first bores 208, to reach a corresponding second compartment 207, i.e. at or close to the intersection of its two radial extending sidewalls 207b.

The blade assembly is clamped together at the central portion of the blades between an inner member 210 and an outer member 211, a plurality of securing bolts 212 extending through bores in the blades and spacer structure. The blade assembly is also secured by a plurality of bolts 213 at the periphery of the blades and the spacer structures, and at intermediate position between the periphery and the centre. The bolts 213 extend through the three blades and the two spacer structures, and are arranged to protrude the spacer structure at the structural part thereof.

The inner member 210 includes an outer sleeve 214 for connecting the blade assembly 200 to a blade driving shaft (not shown) of the machine 1. The outer sleeve 214 includes a central bolt 215 for securing to the blade driving shaft. The inner member 210 also includes a circular flange 216 that projects transversal from the first blade 201 and surrounds the sleeve 214, and forming a circular recess 217 between the sleeve 214 and the flange 216. The free end of the flange 216 has an inwardly extending brim 218 that partly is covering the circular recess 217. At the bottom of the recess 217 adjacent to the inner side walls of the flange 216 there are provided a plurality of third bores 219, one for each first bores 208, for connecting to the first bores 208 of the first blade 201.

When connected to the blade driving shaft (not shown) a spraying nozzle (not shown) is arranged to mate the circular recess 217. During operation, fluid is sprayed towards the circular recess 217. The inward brim 218 helps forming a channel as the centripetal forces urges the fluid to flow radially, which urges the fluid to fill the first and second compartments 206, 207 via the connecting bores 208, 209, 219. Due to the high rotation of the blade assembly 200 and tolerances between the blades 201, 202, 203 and the spacer structures 204, 205, fluid will slowly exit the compartments 206, 207 at the side walls of the compartments 206, 207 facing the periphery, i.e. the third side walls 206b, 207b. The fluid filled compartments 206, 207 and the slow flow there from will efficiently cool the blades 201, 202, 203 and provide moisture to the dust reducing dusting problems.

To increase flow of fluid from the compartments, apertures may be formed in the side wall/s facing the periphery.

Even though the preferred form for the compartments is the triangular shape described above, it would be possible to have other shapes. Furthermore some or all of the compartments could be interconnected.

When using the term central portion 201c, 202c, 203c, the extension of it should be interpreted as the largest area covered by the inner and outer members 210, 211.

Figure 15:
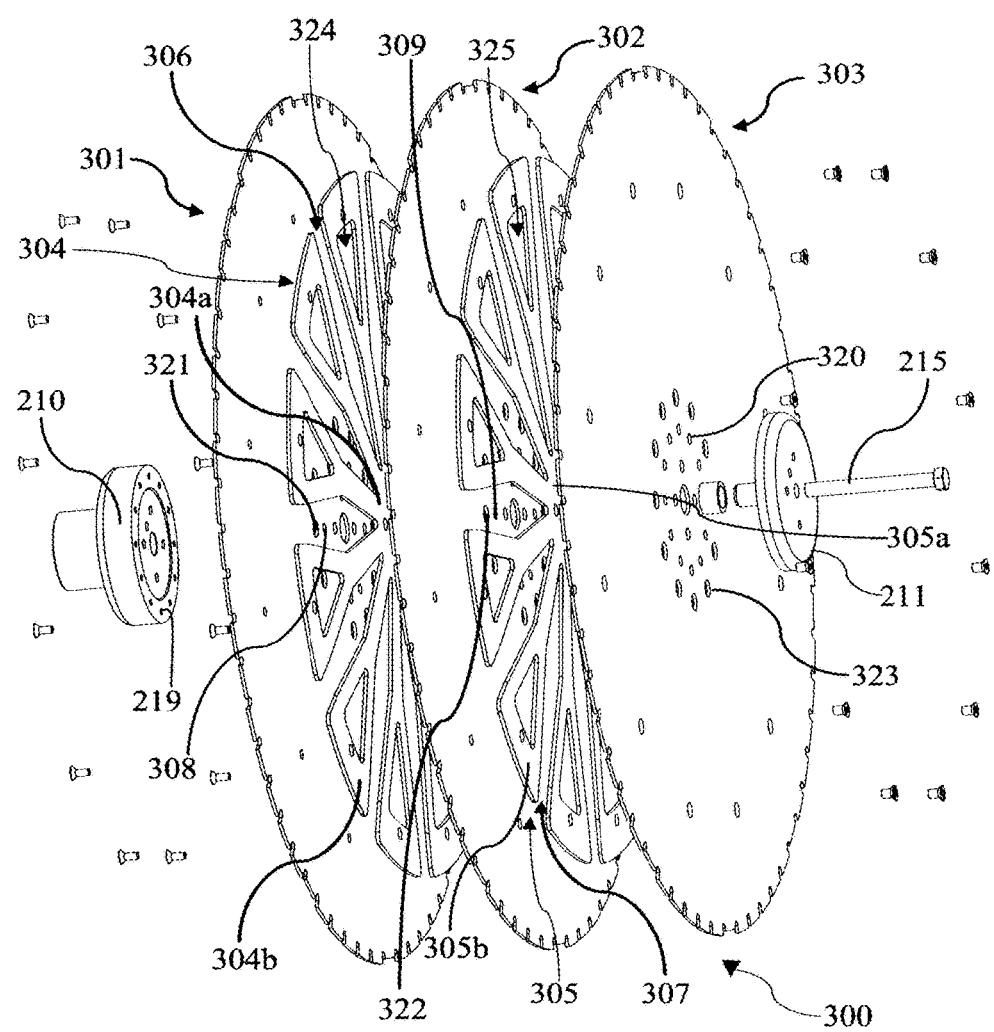
FIG. 15 shows an exploded view of a blade assembly according to a second embodiment.
Figure 16A:
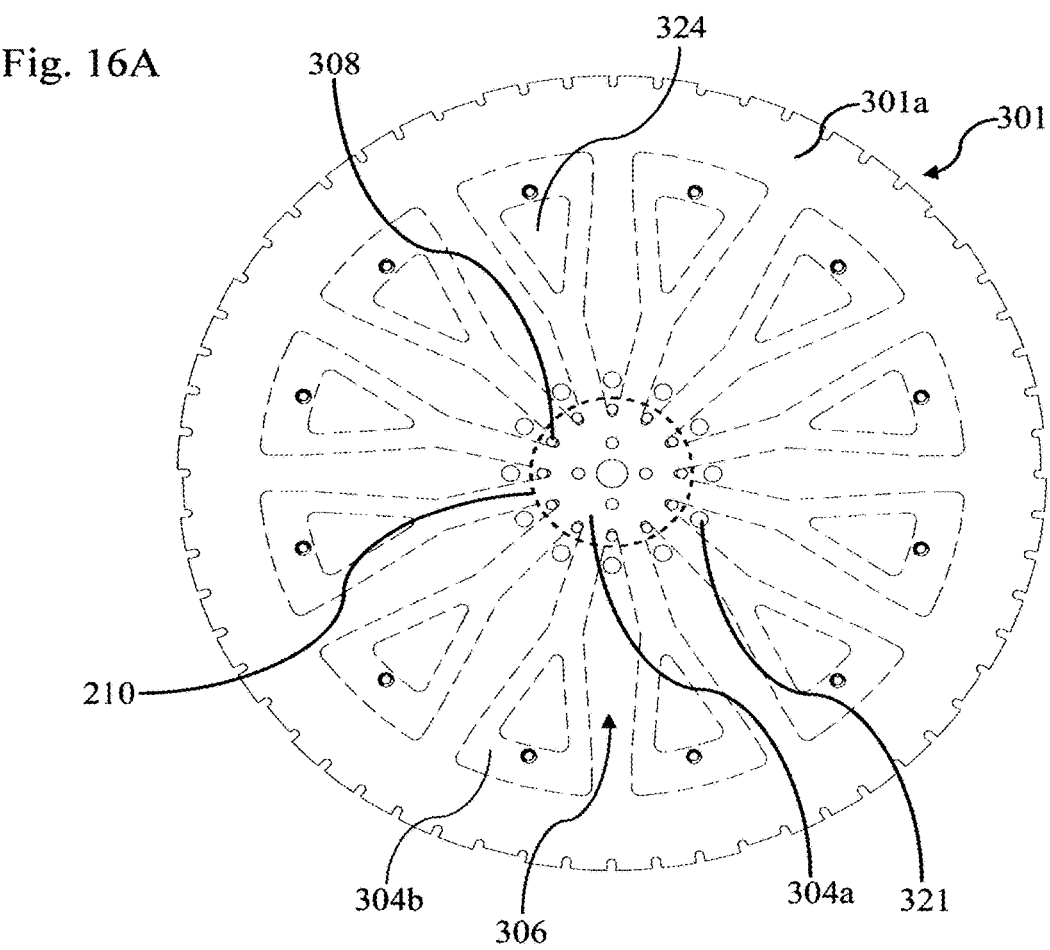
FIG. 16A shows a side view of a blade of the blade assembly of FIG. 15.

FIGS. 15 and 16a show a blade arrangement 300 according to a second embodiment. The embodiment of FIGS. 15 and 16 differs from that of FIGS. 11-14 in that the spacer structures are somewhat different and in that the blades includes air vents. Similar parts have been given the same numbers but in the 3-hundreds. Reference will also be drawn to FIGS. 11-14 when explaining the embodiment of FIGS. 15 and 16.

The blade assembly 300 includes an inner first blade 301 and intermediate second blade 302 and an outer third blade 303. The blade assembly is clamped together at the central portion of the blades between an inner member 210 and an outer member 211 which have the same configuration as the one shown in FIG. 13 and will hence not be further described.

The inner first blade 301 differs from the first blade 201 of FIG. 11-14 in that it has a further plurality of forth bores providing a plurality of first air vents 321 to the first compartments 306, one first air vent for each first compartment. The intermediate second blade 302 differs from blade 202 of FIG. 11-14 in that it further has a plurality of fifth bores providing a plurality of second air vents 322 that connects the first compartments 306 to the second compartments 307, one second air vent for each pair of first and second compartments. The outer third blade 303 differs from the third blade 203 of FIG. 11-14 in that it further has a plurality of sixth bores providing a plurality of third air vents 323 to the second compartments 307, one second air vent for each second compartment, and a plurality of seventh bores 320, which here only serves the purpose of making the first and third blade 301, 303 interchangeable, since the outer member 211 seals against the seventh bores 320. However, the outer member 211 could also be replaced by a flange member with connecting similar to the inner member 210, thereby enabling fluid supply from both sides. Naturally, a blade without the seventh bores 320 could replace the third blade 303.

The air vents 321-323 are preferably located at a radius larger than the radius of the first and second inlets 308, 309; more particularly the air vents 321-323 shown here are located just outside the inner and outer member 210, 211.

Both spacer structures 304, 305 have the same shape and includes a circular central hub 304a, 305a having holes for the central bolt 215 and for the securing bolts 212 and a plurality of radial extending supports 304b, 305b forming a plurality of compartments 306, 307 extending from the central portions of the blades 301-303 towards the working portions of the blades. The supports 304b, 305b are wider at their peripheral ends to improve the strength of the blade assembly. The supports 304b, 305b also have hollows 324, 325 which are mainly for reducing the weight of the spacer structure 304, 305.

As can be seen in the figures the compartments 306, 307a re open ended towards the periphery of the blades 301-303 forming a plurality of passages for air and water. This increases the air and water flow through the compartments. In FIG. 16a it can be seen that the compartments 306 first becomes wider with increasing radius until it reaches approximately half the radius of the blade 301 and thereafter they become narrower towards the working portion 301a. The fluid flow during operation is preferably in the range of 1-10 liter/minute.

When the blade assembly 300 is rotating the spacer structure 304, 305 and the formed compartments 306, 307 provides suction from the centre towards the periphery of the blade assembly. I.e. it operates similar to a centrifugal fan with radial fan blades. Therefore air and water will be transported from the centre and out at the periphery, efficiently cooling the blades. Of course instead the arrangement could be for transporting only air or only fluid or different combinations as further described below.

FIG. 16b differs from FIG. 16a only in that the blade 301 has at least one radial extending slots 326, extending from a central 301c or inner portion, preferably within a third of the maximum radius, of the blade 301 towards the working portion 301a. The slot/s 326 extends essentially straight. Preferably the slots 326 are arranged in pairs where the slots in a pair extending in opposite radial directions. Furthermore the slot/s 326 is arranged to extend within the compartment/s or passage 306 of the blade. Preferably every second compartment or passage having a slot 326 extending along within the compartment 306. Preferably the other blades 302, 303 of the blade assembly 300 also have such slots extending parallel to the slot/s 326. However the radial extending slots of two adjacent blades may also be displaced such that a slot of a first blade extends parallel to a position between two slots of a second adjacent blade. Furthermore, it may also be the case that only the outermost blades 301,303 have such radial extending slots 326 or only the central blade 302. One purpose of the slots 326 is to minimize stress to heat expansion by allowing the blades, when heated, to expand in the void provided by the slots 326. Another advantage with the slots 326 is to increase bending flexibility. The bending flexibility is in particular enhanced when the slots 326 of different blades are positioned parallel to each other and when the slots 326 are arranged in pairs extending radial from an inner or central portion of the blade in opposite directions. Of course such slots 326 can be provided to all blades of the blade assemblies exemplified in the present application.

Even though the air vents 321-323 has been shown to be on a radius outside the inner and outer member 210, 211, they could be made within the radius of the inner and outer member 210, 211, in particular if the cooling fluid is supplied through the axial center as briefly described above.

Furthermore the blade assembly 300 could be made without inlets 308, 309 for cooling fluid and only rely on air cooling through air vents. Then the inner and outer member 210, 211 could be simplified, by removing the configurations relating to the fluid supply. The inner and outer member 210, 211 could have a smaller diameter and the air vents 321-323 could be moved closer to the centre if desired. Of course instead of reducing the diameter the inner and outer member 210, 211 could be made to have bores mating the air vents 321, 323 of the first and third blade 301, 303.

Furthermore, the air vents 321, 323 of the first or the third blade could be omitted so that cooling air is only sucked from one side. E.g. water could be supplied on one side and air on the opposite side, or water and air could be supplied from the same side of the blade assembly.

Furthermore, every second air vent 321, 323 of the first and the third blade could be omitted, in such manner that each every pair of compartments 306, 307 are reached by either an air vent of the first blade or an air vent of the third blade.

Furthermore the interconnecting second air vents 322 could be omitted when having air vents on both outer sides of the blade assembly 300.

Furthermore the air vents in the first or the third blade could have conical shape, either with the cone tip pointing towards the compartment or the opposite.

Preferably the air vents have a larger area than that of the inlets for fluid, more preferably the area is more than 50% larger. Preferably, of a blade in the range of 500-1200 mm, the diameter of the air vent is in the range of 5-30 mm, more preferably 10-25 mm. Preferably, the diameter of the inlet for fluid, of a blade in the range of 500-1200 mm, is in the range of 5-20 mm, more preferably 7-15 mm.

Even though the number of blades 201-203; 301-303 have been described as three, it would be possible to use only two blades and with one spacer structure in between.

Furthermore it could be possible to use even more blades, adding one spacer structure for each added blade.

Even though we have described a blade assembly 200; 300 where the fluid is supplied outside the axial centre and from the machine side, it would be possible to supply fluid through the axial center. For instance by using a hollow drive shaft and having openings in the drive shaft to the compartments in the blade assembly. Alternatively fluid may be supplied at the opposite side to where the drive shaft connects. In such case, a recess in the outer member with radial openings to the compartments may be provided.

One or both of the axial walls of the compartments 206, 207; 306, 307 could be provided by the spacer structure 204, 205; 304, 305. In the case of one axial wall provided by the spacer structure; instead of holes, machined recesses in the structure could be provided. In the case of two axial walls provided by the spacer structure; the spacer structure could include two parts both having machined recesses that are mounted facing each other.

Besides cooling the blades by supplying fluid to the compartments 206, 207; 306, 307 through the bores 219 of the inner member 210 and sucking air through the first and third air vents 321, 323, fluid can be sprayed to the outer side/s of the first and/or third blade. When using air vents, the air vents may then suck both air and fluid that is sprayed on the outer side/s of the first and/or third blade The compartments 206, 207; 306, 307 could be made to start outside the central portions, by having interconnecting channels from the central portions. Further a compartment could be arranged as a volume enclosed solely or partly within the spacer structure itself.

Figure 17:
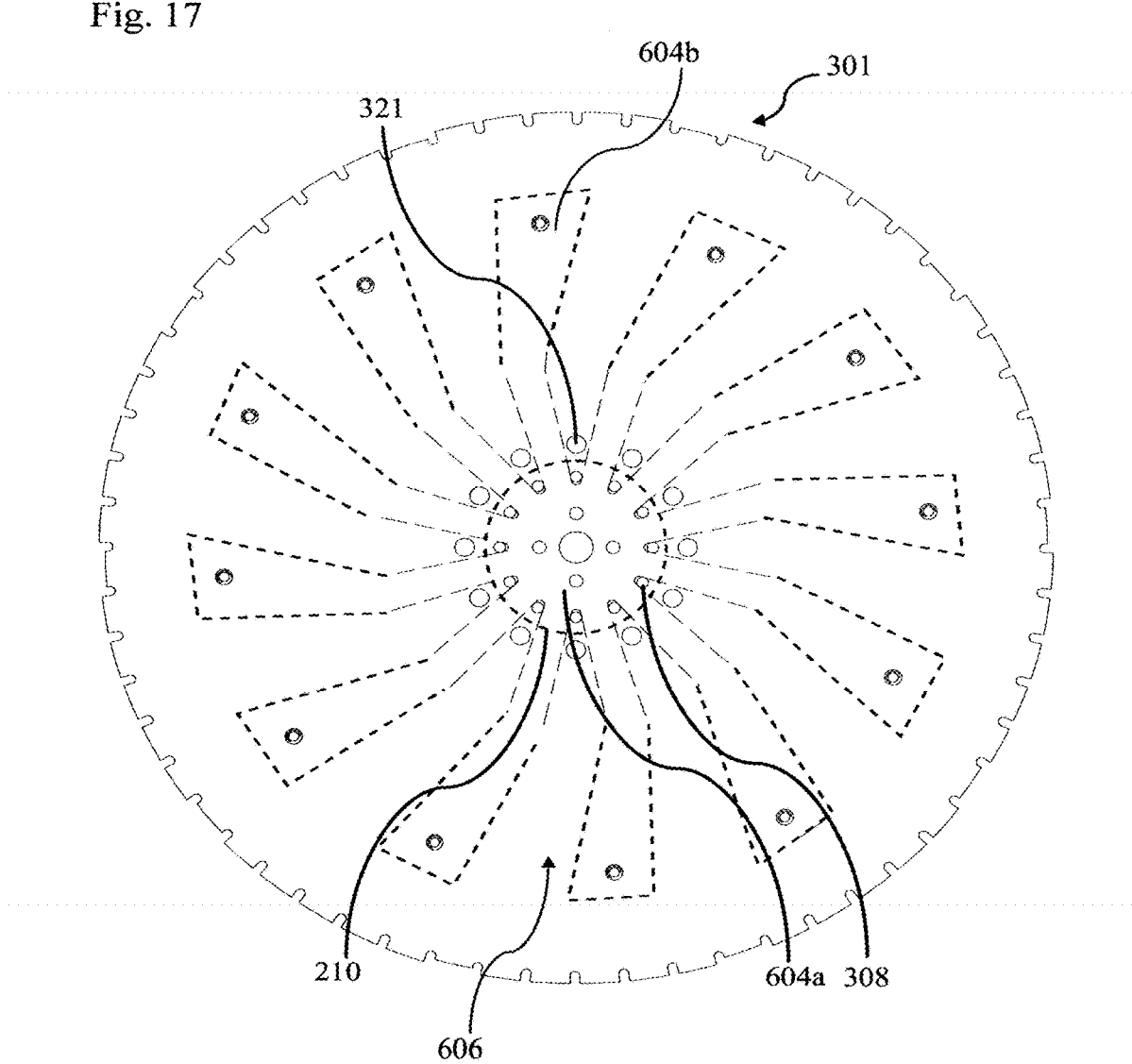
FIG. 17 shows a blade with a spacer structure according to a third embodiment.

FIG. 17 shows a third embodiment of the spacer structure. Here, the supports 604b, which extends from the central hub 604a, are curved, and hence forming curved passages 606 between the blades. Thus the curved supports functions similar as backward or forward curved fan blades of a centrifugal fan.

Figure 18:
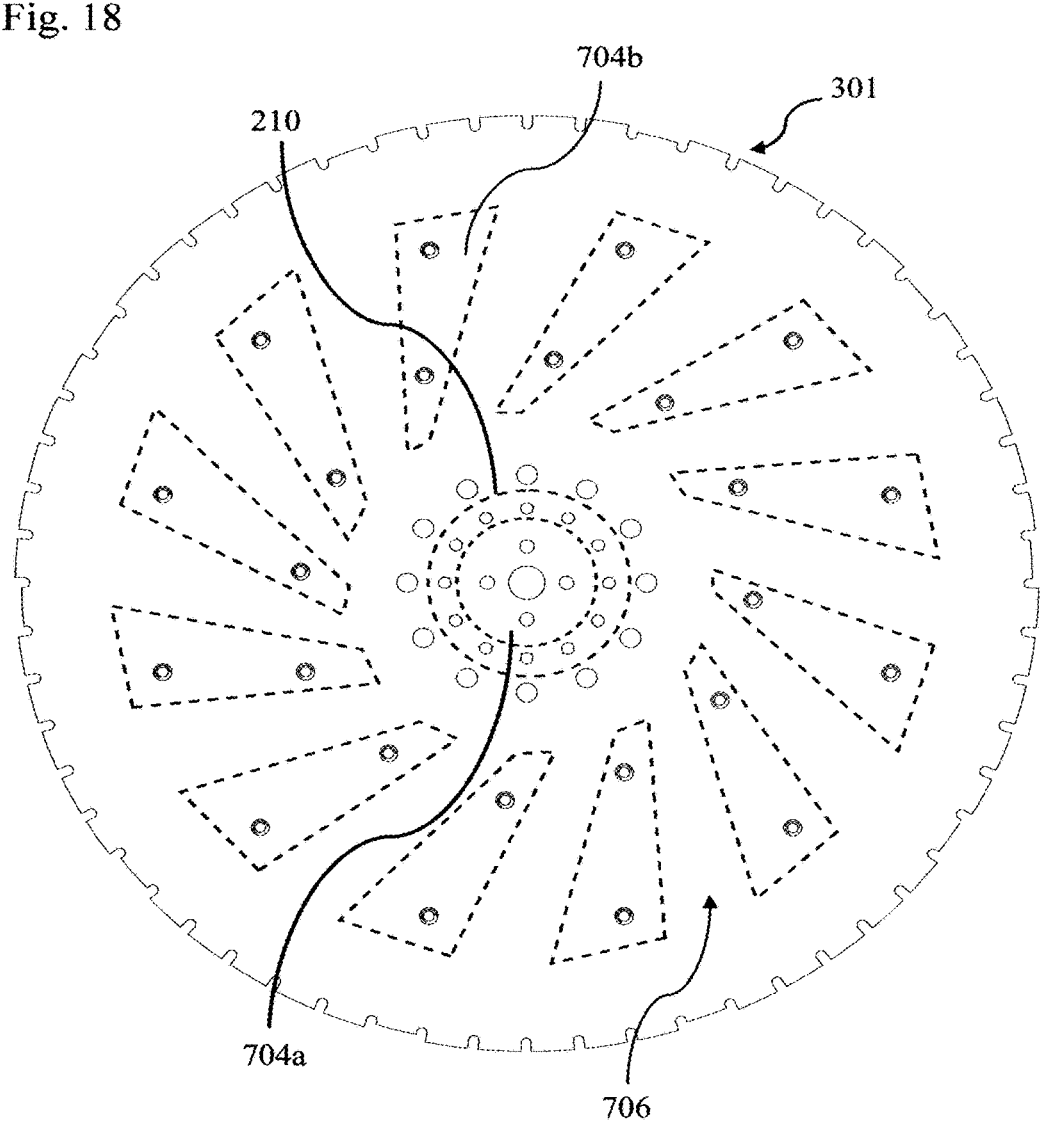
FIG. 18 shows a blade with a spacer structure according to a forth embodiment.

In FIG. 18 a forth embodiment of the spacer structure is shown. Here, spacer structure is made up by several separate supports, a central hub 704a provides support for the clamping by the inner and outer member 210, 211, and a plurality of blade shaped supports 704b has the purpose of providing a suction when the blade assembly rotates, sucking air and water from the central part of the blade assembly out through the periphery. The blade shaped supports 704b works as fan blades in a centrifugal fan and could e.g. be made radial, backward curved, or forward curved.

Figure 19:
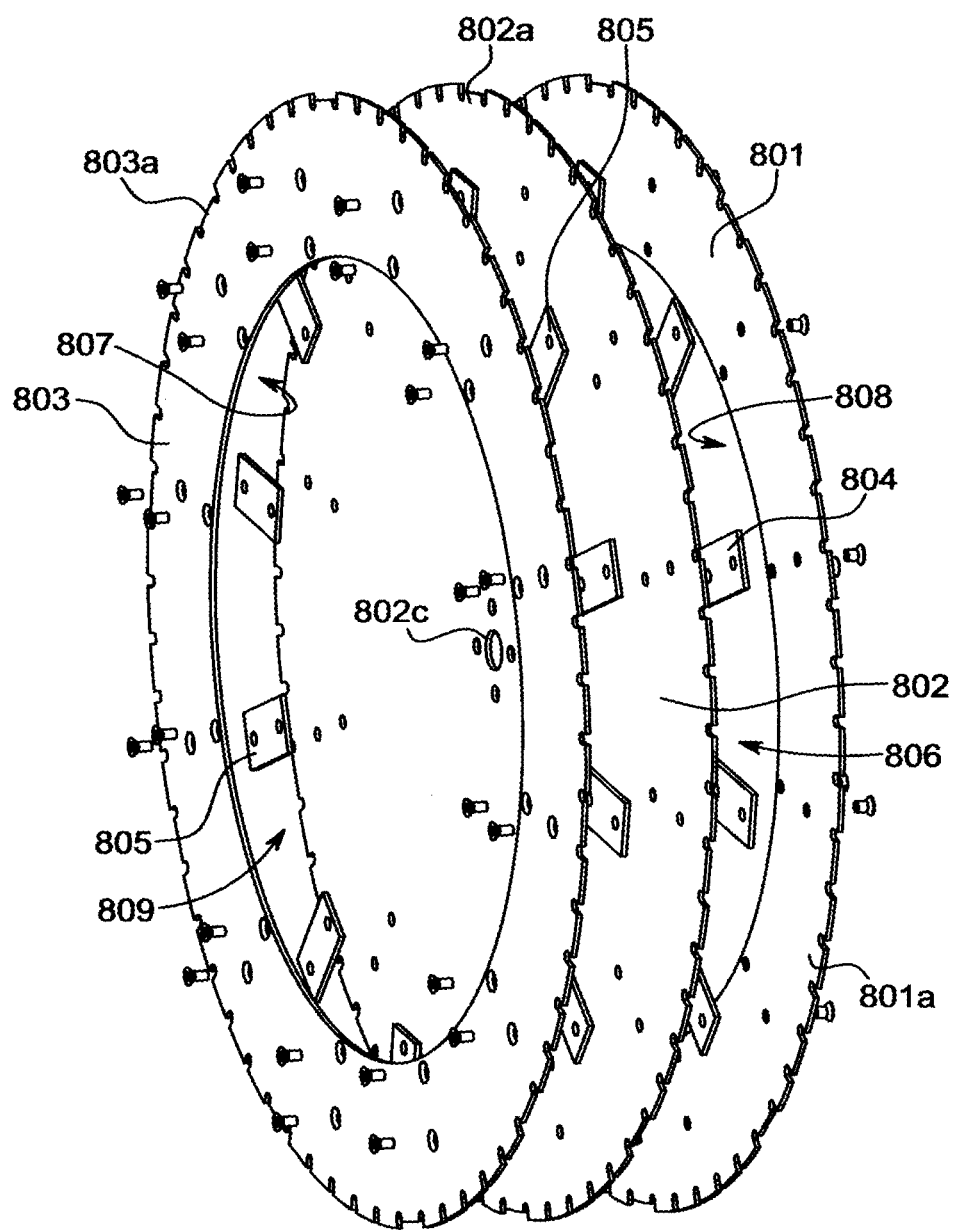
FIG. 19 shows a blade assembly having two ring blades and one full blade.

In FIG. 19 the two outer blades 801 and 803 are ring blades whereas the intermediate blade 802 is a full blade. Here the central portion 802c of the intermediate blade 802 provides the blade assembly central portion and a blade support structure 802b extending between the working portion 802a of the intermediate blade 802 and the blade central portion 802c provides the blade assembly support structure. The blade assembly central portion 802c for being operated on by a device for driving the blades. The blades are spaced apart by a plurality of spacer structures 804,805 forming at least one passage 806, 807 between the blades extending essentially radially towards the working portions 801a, 802a, 803a. The passages 806, 807 covering a significant part of the periphery at a radius of the spacer structures. The central voids 808, 809 within the inner rims of the outer ring blades provide inlets for air and/or liquid to the passages 806, 807.

Figure 20:
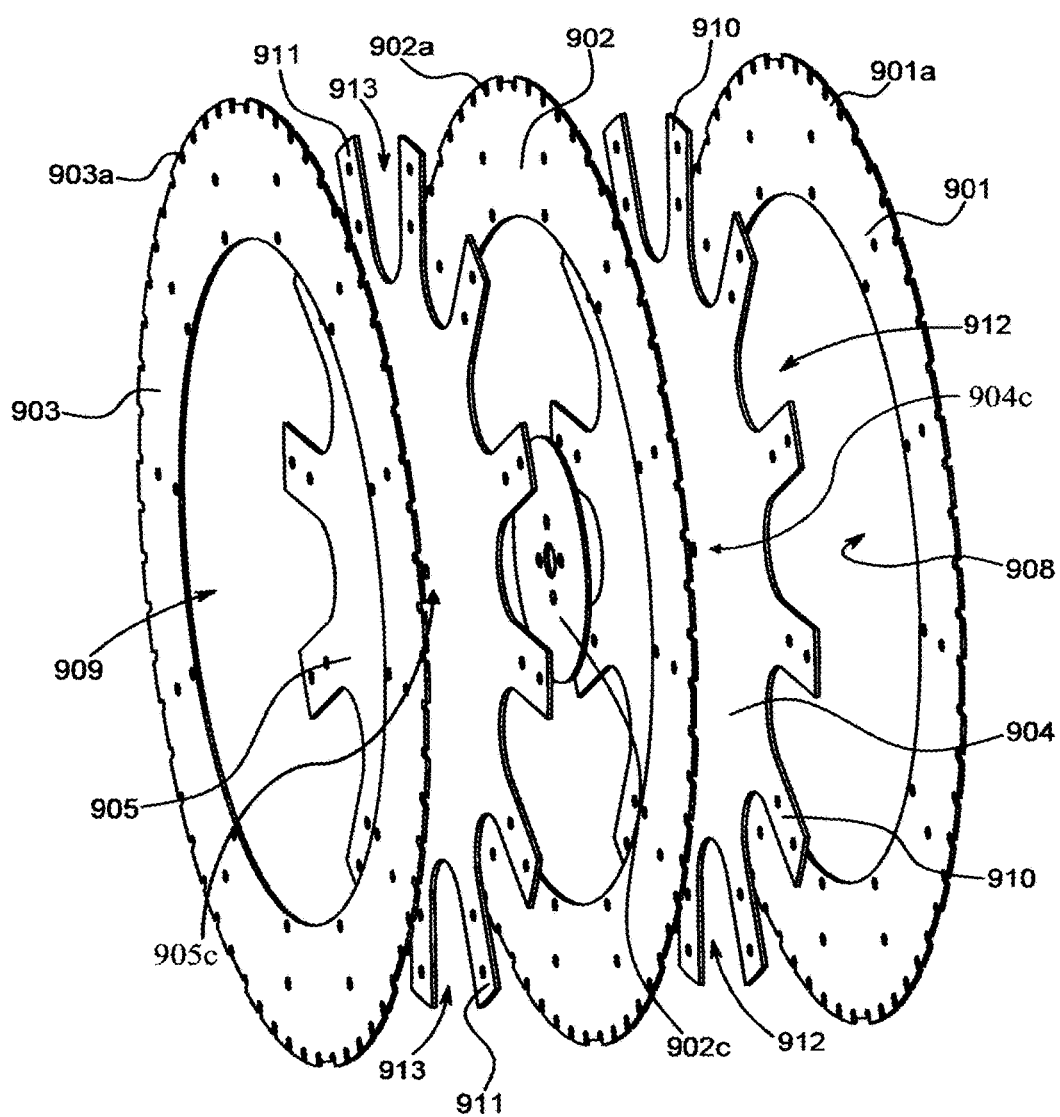
FIG. 20 shows a blade assembly having three ring blades.
Figure 21:
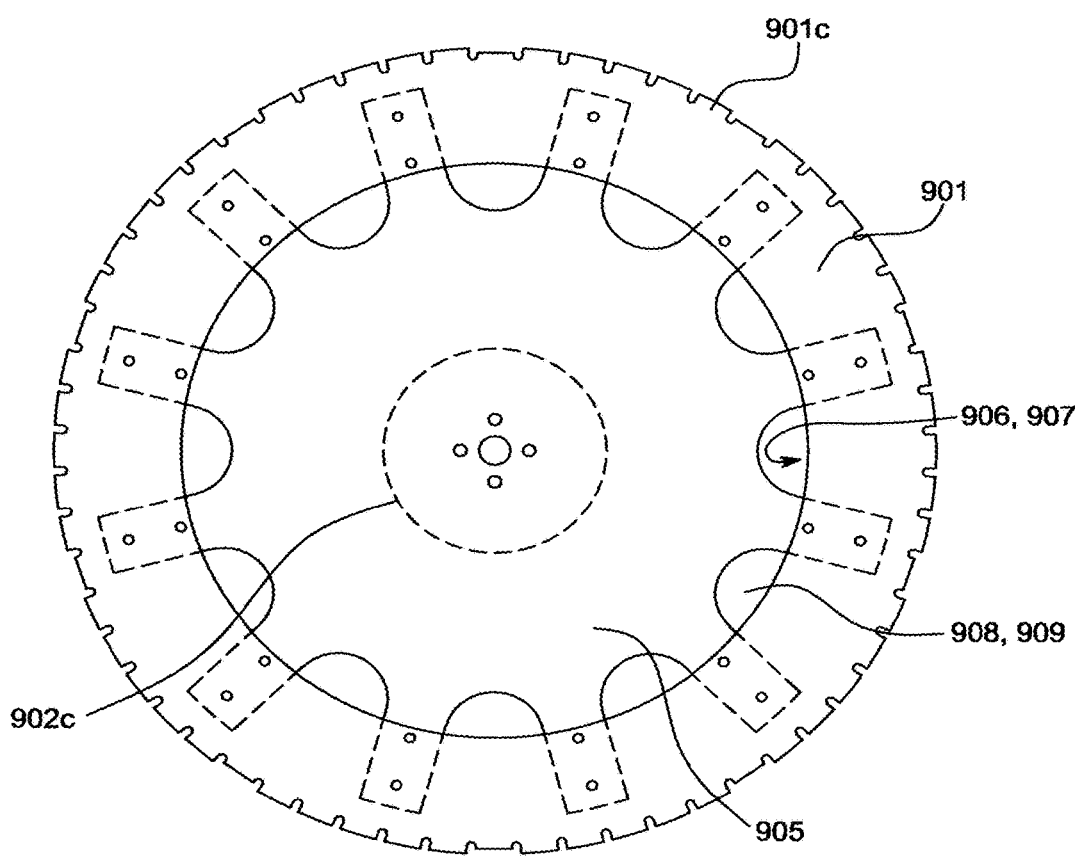
FIG. 21 shows a side view of a blade of the blade assembly of FIG. 20.

In FIG. 20-21 all blades 901, 902 and 903 are ring blades. The blades are spaced apart by a two spacer structures 904, 905 extending from the axial center of the blade assembly 900 towards the working portion of the blade assembly 900. In the center within the intermediate ring blade 902 a central support 902c is provided. The central portions 904c, 905c of the two spacer structures 904,905 and the central support 902c together provides the blade assembly central portion for being operated on by a device for driving the blades. The body of the two spacer structures 904,905 provides the blade assembly support structure. The two spacer structures 904, 905 have a plurality of radial extending protrusions 910, 911 that extends from a radius shorter than the inner rim of the ring blades 901-903. The voids 912, 913 between the radial extending protrusions 910, 911 forming at least one passage 906, 907 between the blades extending essentially radial towards the working portions 901a, 902a, 903a. The passages 906, 907 covering a significant part of the periphery at a radius of the radial extending protrusions 910, 911. The central voids 908, 909 within the inner rims of the outer ring blades 901, 903 provide inlets for air and/or liquid to the passages 906, 907.

Also the ring blades 801, 802, 803; 901, 902, 903 carrier blades and carrier saw blades 1000 and spacer structures 904, 905 may have a plurality of essentially radial extending slots as described in relation to the blade 301 of FIG. 16b. For the ring blades 801, 802, 803; 901, 902, 903 the slots extends from the inner rims of the blades or a radius somewhat further out, and towards the working portion of the blades. Preferably the slots are arranged in pairs where the slots in a pair extending in opposite radial directions. Similarly the slots here are arranged to extend within a passage 806, 807, 906, 907 of the blade, preferably every second passage having a slot extending along within the passage.

In the previous shown blades each blade is a diamond saw blade having one row of cutting segments separated by notches around the rim of the blade.

Figure 22:
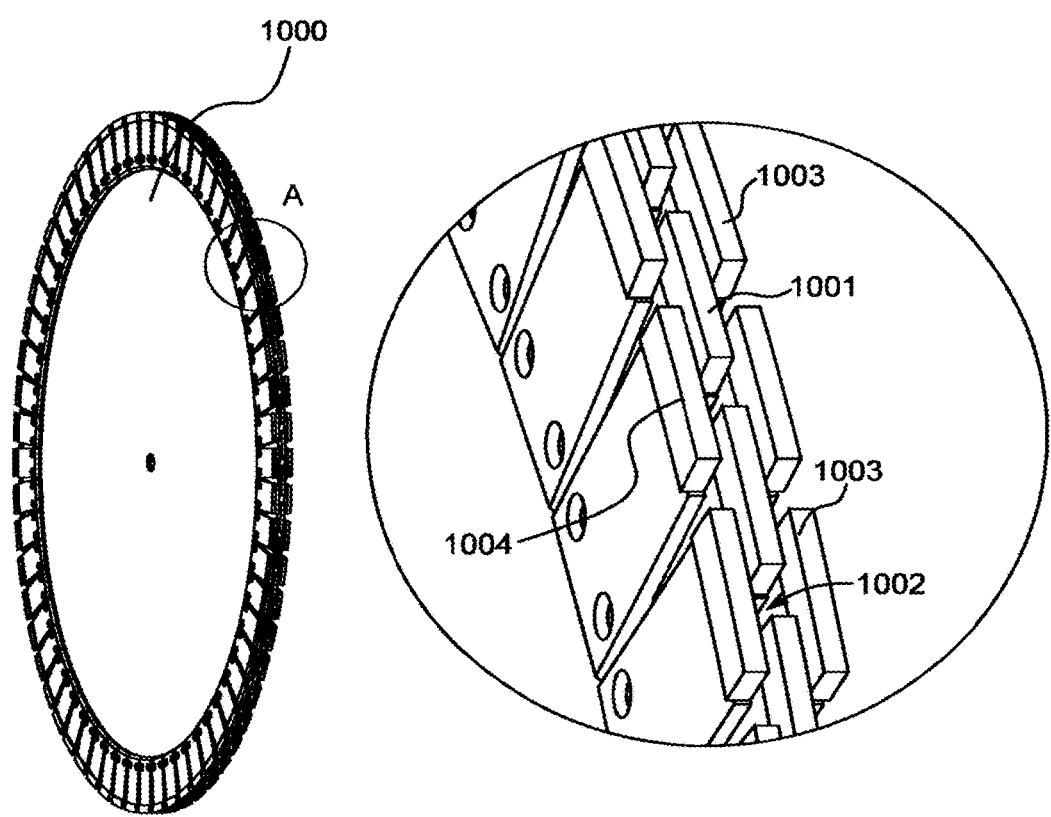
FIG. 22 shows a carrier saw blade having additional rows of cuttings segments.
Figure 23:
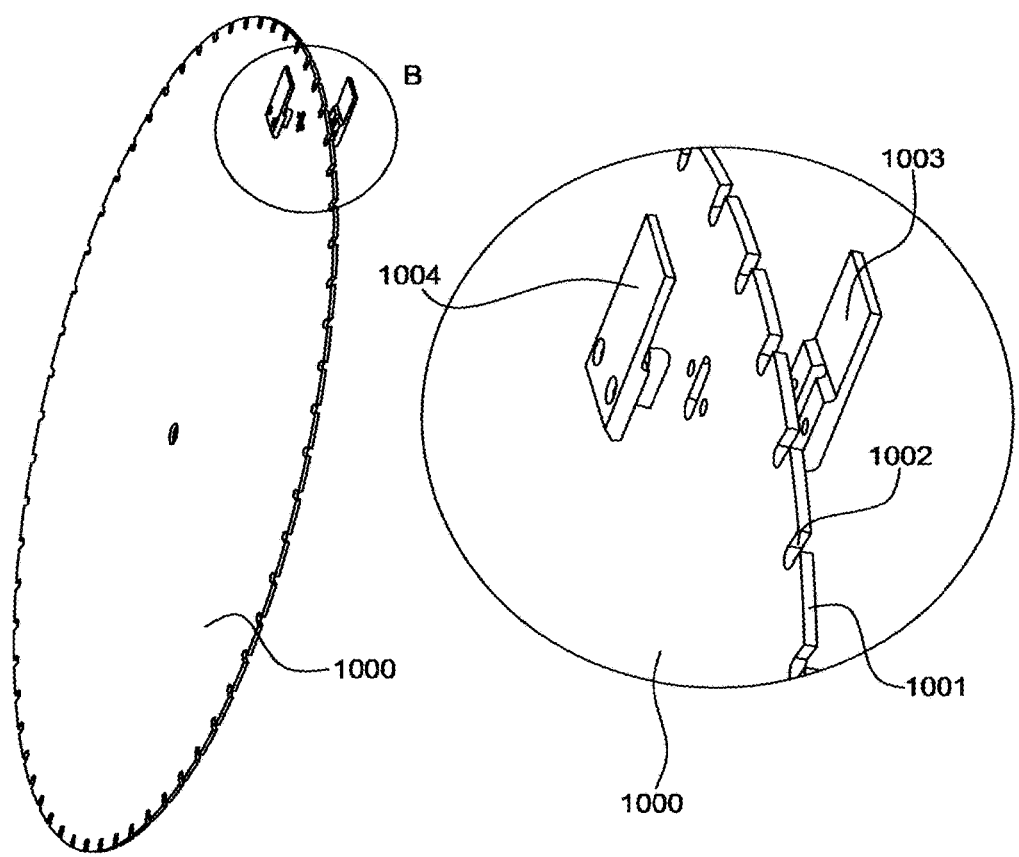
FIG. 23 shows how additional cuttings segments can be fastened to a carrier saw blade.

In FIG. 22 a first sectional saw blade is made up of a first row of primary cutting segments 1004 fastened to a carrier saw blade 1000 having a first row of first cutting segments 1001 separated by notches 1002 around the rim of the blade 1000. A second sectional saw blade is made up of a second row of secondary cutting segments 1003 fastened to the carrier blade or the carrier saw blade 1000. The primary cutting segments 1004 are individually secured to one side of the carrier saw blade 1000, and the secondary cutting segments 1004 are individually secured to the other side of the carrier saw blade 1000. Preferably passages for air and/or liquid are arranged in between neighboring cutting segments 1004, 1003 or below the segments. The cuttings segments 1003, 1004 of the sectional saw blades are detachably mounted to the carrier saw blade 1000, so that they can be replaced when worn out. Instead of having the carrier saw blade 1000 it would be possible to have carrier blade without cutting segments around its rim. Thereby all segments can easily be replaced when worn out. As shown in FIG. 23 the primary 1004 and the secondary 1003 cutting segments are secured to the carrier blade 1000 in pairs, one pair consisting of a primary and a secondary cutting segment that are laterally aligned. The primary cutting segments 1004, and consequently the secondary cutting segments 1003, are placed so that they overlap the notches 1002 of the carrier saw blade 1000.

By having additional sectional saw blades it may be possible to reduce the number of required full blades or ring blades of the blade assembly while keeping the same cutting width/capacity. It may even be possible to use only one carrier saw blade 1000, or using only a carrier blade holding two or three sectional saw blades. I.e. a single carrier blade having two or three rows of cutting segments may substitute a blade assembly of the three blades each having single rows of cuttings segments. Of course one or two additional rows of cutting segments can be used for one, two or three blades, etc of a blade assembly to increase its performance. For instance the outer blades can each be made having one or two additional rows of cutting segments in combination with an intermediate blade having a single row, or vice versa the inner blade one or two additional rows of cutting segments while the outer blades each have a single row of cuttings segments.

Figure 24:
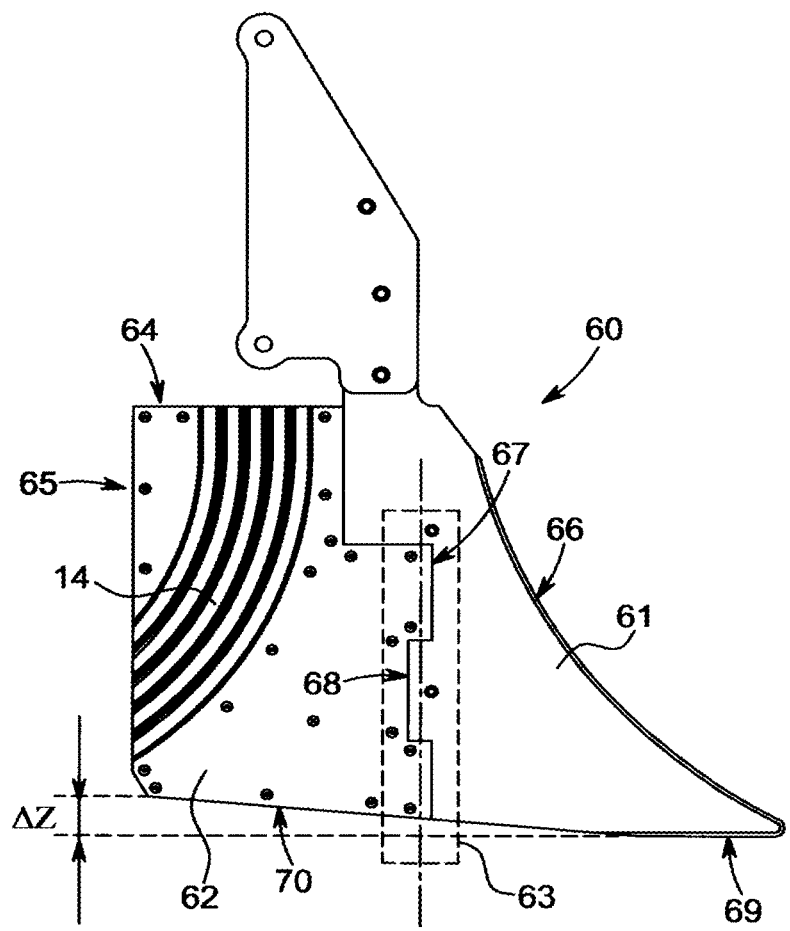
FIG. 24 shows a hinged consolidation and laying means according to a first embodiment.

In FIG. 24 a laying and consolidation means 60 is shown. Here the laying and consolidation means 60 includes a plow structure 61 and a laying means 62 that are connected via a hinge 63 between a rear end 68 of the plow structure 61 and a front end 67 of the laying means 62. A plow front end 61 is preferably concave and following the curvature of the blade arrangement 2 which in front of the plow structure 61 when excavating a trench 5. Preferably the front part of the plow front end 61 is solid. The side walls of the plow structure 61 and a laying means 62 prevents the trench walls from partly or completely collapsing before the at least one flexible casing or tube, cable or wire is fed into the trench 5. The laying means 62 includes one or more feeding ducts 14 that each has a inlet at an upper side 64 of the laying means 62 for receiving the flexible casing, cable or wire and a outlet at a lower rear end 65 of the laying means 62 for feeding the cable or wire to the trench 5. Each feeding duct 14 can be arranged to guide one or more flexible casings or tubes, wires, or cables, preferably one flexible casing or tube. Thus the at least one feeding duct 14 can be one, e.g. feeding a larger flexible casing with room for multiple cables, or several tubes, wires or cables on top of each other. Preferably the feeding duct 14 is at least two, preferably at least four. One of the side walls of the laying means 62 preferably has a detachable cover (not shown). In FIG. 24 the laying means 62 are shown with the cover removed exposing the feedings ducts 14.

The hinge 63 between the plow structure 61 and the laying means 62 reduces the risk that the consolidation and laying means 60 gets stuck in a curved trench.

In one embodiment the consolidation and laying means 60 have the same thickness or is no more than 1 mm thinner than the blade arrangement 2. The advantage with this embodiment is that both the blade arrangement 2 and the consolidation and laying means 3 can be made as thin as possible, i.e. as thin as the size of the flexible casing or tube, cable or wire allows.

Alternatively, the consolidation and laying means 60 is made thinner than the blade arrangement 2, preferably at least 1 mm thinner, more preferably at least 2 mm thinner, most preferably at least 5 mm thinner, even more preferred 10 mm thinner. One advantage of having the consolidation and laying means 60 thinner than the blade arrangement 2, is that if the trench 5 is not to be cut in a straight line but rather allowing for a curvature, the lesser thickness of the consolidation and laying means 60 reduces the risk for it to get stuck in the trench 5, i.e. the more thinner the consolidation and laying means 3 is in relation to the blade arrangement 2, the steeper curves can be done when making the trench 5. Of course this is emphasized by the hinge.

Furthermore the laying means 62 may be made thinner than the plow structure 61, thereby further reducing the risk of the consolidation and laying means 60 to get stuck in the trench 5.

The lower ends or bottoms 69, 70 of the plow structure 61 and the laying means 62 are structured such that the consolidation and laying means 60 continuously or sequentially decreases its draught in the trench in direction from the front end 61 of the plow structure to the rear side 65 of the laying means. As seen in FIG. 24 the lowest point at the rear end 65 of the laying means 62, has Δζ larger clearance to a horizontal line than the front tip of the plow structure 61.

Figure 25:
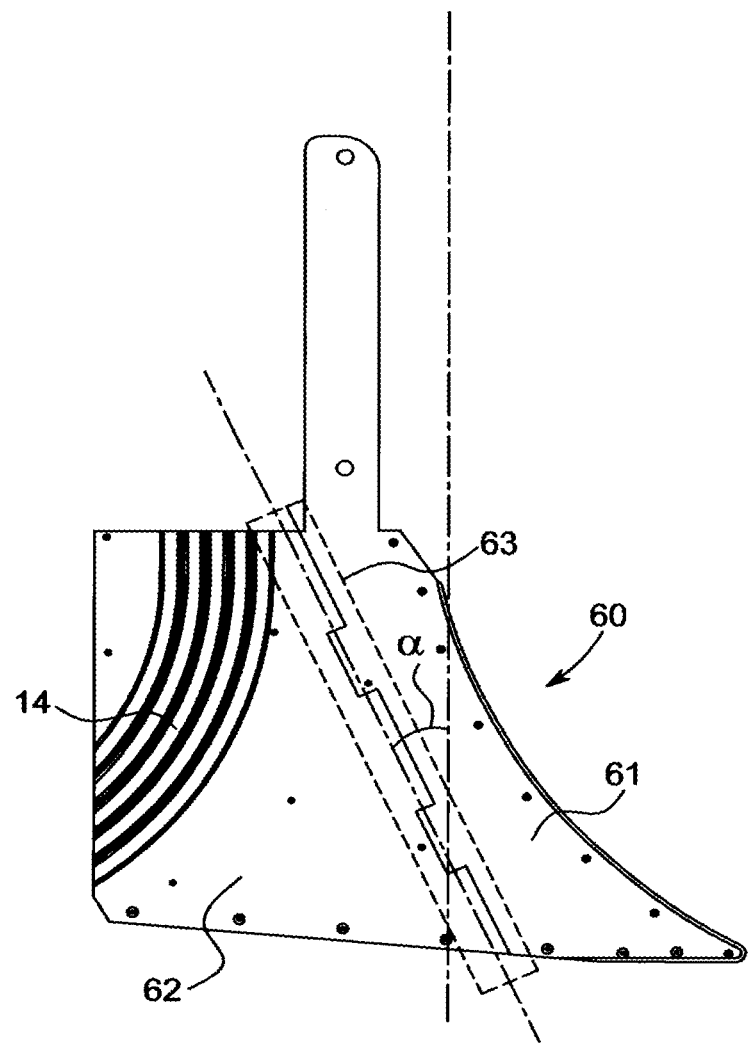
FIG. 25 shows a hinged consolidation and laying means according to a second embodiment.

In FIG. 25 a variant of the hinged consolidation and laying means 60 is shown. Here the hinge 63 between the plow structure 61 and the laying means 63 is tilted with an angle a as compared to the example of FIG. 24 where the hinge 63 is essentially vertical. In the present application the angle a is defined as positive when the hinge 63 is tilted such that a lower portion of the hinge is in front of an upper portion of the hinge.

Preferably, the hinge 63 is arranged with an angle a to the vertical in the range of −60° to 60°. For an essentially vertical setup the hinge is in the range of −15° to 15°, preferably in the range of −10° to 10°, and most preferably −5° to 5°. For a tilted version the hinge 63 is preferably tilted such that a lower portion of the hinge is in front of an upper portion of the hinge. Thus preferably, the angle a to the vertical in the range of 15° to 60°, preferably 20° to 50° and most preferably 35° to 50°. This allows for a compact plow structure 61.

Figure 26A:
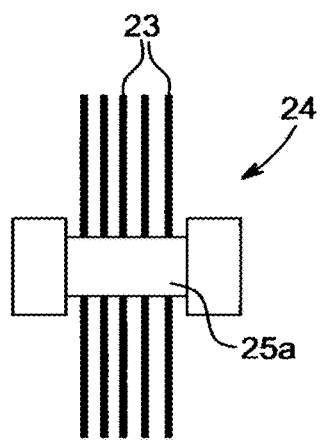
FIG. 26A shows a schematic side view of a feeder device according to a first embodiment.
Figure 26B:
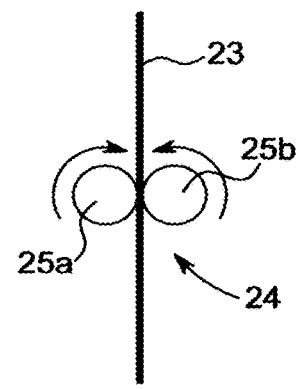
FIG. 26B shows a schematic front or rear view of the feeder device of FIG. 26A.

FIGS. 26A and 26B shows a schematic layout of a feeder device 24 for feeding at least one flexible casing or tube, cable or wire 23 down into at least one feeding ducts 14 of the consolidation and laying means 3, 60. The feeder device 24 is arranged on the machine 1 above the inlet to the feeding ducts 14. In FIG. 26a the feeder device 24 is seen from a lateral side of the machine and in FIG. 26B the feeder device 24 is seen as if standing in front or rear of the machine 1. In this embodiment the at least one flexible casing or tube, cable or wire 23 are arranged in one single longitudinal row above the feeding ducts 14 and are pressed between two rolls 25a, 25b, of which at least one and preferably both are driven. Thereby the flexible casing or tube, cable or wire 23 can be urged downwards and be guided by the feeding ducts 14 into the trench 5.

Figure 26C:
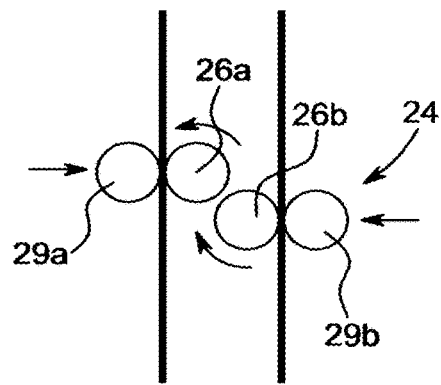
FIG. 26C shows a schematic front or rear view of a feeder device according to a second embodiment.

FIG. 26c shows another embodiment of the feeder device 24 seen as if standing in front or rear of the machine 1. Here the at least one flexible casing or tube, cable or wire 23 are arranged in two longitudinal rows above the feeding ducts 14 that are pressed between two pairs of rolls 29a, 26a; 26b, 29b. At least two of the rolls are driven; here the two inner rolls 26a, 26b are driven preferably by having a gear connection between them.

Whereas the invention has been shown and described in connection with the preferred embodiments thereof it will be understood that many modifications, substitutions, and additions may be made which are within the intended broad scope of the following claims. From the foregoing, it can be seen that the present invention accomplishes at least one of the stated objectives.

For instance, the different embodiments of blade assemblies described in the present application could be used in other machines than the one described in the present application using circular cutting blades. For instance, the blade assemblies could be used in road saws and in hand held power cutters. Of course, in hand held power cutters, the blade diameter and other size factors can be smaller than the ranges mentioned above.

The fluid used to cool the blades is preferably water.

What is claimed is:

1. A laying machine for laying a tube, cable, or wire, the laying machine comprising:
a blade assembly mounted to a shaft that rotates to cut a trench in a ground;
a consolidation and laying means being arranged behind the blade assembly for clearing and safeguarding the trench from collapsing while laying a tube, cable, or wire into the trench, wherein the consolidation and laying means comprises:
a plow front end following the blade assembly;
a feeding duct that has an inlet at an upper side of the consolidation and laying means for receiving the tube, cable, or wire; and
an outlet at a rear or bottom side of the consolidation and laying means for feeding the tube, cable, or wire into the trench,
wherein when the laying machine is in operation, a lowest portion of the consolidation and laying means is arranged 10-100 mm above a lowest portion of the blade assembly.

2. A laying machine for laying a tube, cable, or wire, the laying machine comprising:
a blade assembly configured to make a trench in a ground;
a consolidation and laying means being arranged behind the blade assembly for clearing and safeguarding the trench from collapsing while laying a tube, cable, or wire into the trench, wherein the consolidation and laying means comprises:
a plow front end following the blade assembly;
a feeding duct that has an inlet at an upper side of the consolidation and laying means for receiving the tube, cable, or wire; and
an outlet at a rear or bottom side of the consolidation and laying means for feeding the tube, cable, or wire into the trench, wherein when the laying machine is in operation, a lowest portion of the consolidation and laying means is arranged 10-100 mm above a lowest portion of the blade assembly, wherein the blade assembly comprises:
a first blade comprising:
a first working portion at the periphery of the first blade;
a first central portion around an axial center of the first blade; and
a support structure extending between the first working portion and the first central portion; and
a second blade comprising:
a second working portion at the periphery of the second blade;
a second central portion around an axial center of the second blade; and
a second support structure extending between the second working portion and the second central portion,
wherein the first blade and the second blade are axially aligned, and
wherein the first blade and second blade are spaced apart by a first spacer structure, the first spacer structure forming a first compartment between the first blade and the second blade, the first compartment extending radial from the first central portion and second central portion toward the first working portion and the second working portion, the first compartment covering at least 30% of the first spacer structure, and wherein a first inlet for air or liquid perforates the first blade between the first working portion and the first central portion to reach the first compartment.

3. The laying machine of claim 2, wherein the first compartment is in contact with the first central portion and the second central portion.

4. The laying machine of claim 2, wherein the first inlet is at or located close to the first central portion.

5. The laying machine of claim 2, wherein at least one axial wall of the first compartment is the first blade or the second blade.

6. The laying machine of claim 2, wherein a first air vent perforates the first blade and sucks air from outside the blade assembly into the first compartment.

7. The laying machine of claim 6, wherein the first inlet may include a plurality of inlets, and wherein the first air vent may include a plurality of air vents, and wherein the first compartment may include a plurality of compartments, and wherein one of the plurality of inlets and one of the plurality of air vents corresponds to one of the plurality of compartments.

8. The laying machine of claim 2, wherein the first compartment comprises a first side wall and a second side wall, each of the first side wall and the second side wall extending radially from the first central portion and the second central portion toward the first working portion and the second working portion to a predetermined distance.

9. The laying machine of claim 8, wherein the first compartment further comprises a third side wall extending between the first side wall and the second side wall and defining the outer edge of the first compartment, wherein the third side wall is at a distance closer to the first working portion and second working portion than to the first central portion and the second central portion.

10. The laying machine of claim 8, wherein the first compartment is open ended toward the first working portion and the second working portion.

11. The laying machine of claim 2, wherein the blade assembly further comprises a third blade, wherein the second blade and the third blade are spaced apart by a second spacer structure, the second spacer structure forming a second compartment between the second blade and the third blade, the second compartment covering at least 30% of the second spacer structure, and wherein a second inlet for air or liquid perforates the second blade between the second working portion and the second central portion to reach the second compartment.

12. The laying machine of claim 11, wherein the second compartment is in contact with the second central portion and a third central portion of the third blade.

13. The laying machine of claim 11, wherein the second inlet is at or located close to the second central portion.

14. The laying machine of claim 11, wherein a second air vent perforates a second blade and connects the first compartment to the second compartment.

15. The laying machine of claim 14, wherein the second inlet includes a plurality of inlets, and wherein the second air vent includes a plurality of air vents, and wherein the second compartment may include a plurality of compartments, and wherein one of the plurality of inlets and one of the plurality of air vents corresponds to one of the plurality of compartments.

16. The laying machine of claim 14, wherein a third air vent perforates the third blade and sucks air from outside the blade assembly into at least the second compartment.

17. The laying machine of claim 11, wherein the first inlet and the second inlet are aligned so that the first inlet is facing the second inlet.

18. The laying machine of claim 11, wherein the second compartment comprises a first side wall and a second side wall, each of the first side wall and the second side wall extending radially from the second central portion and the third central portion of the third blade toward the second working portion and a third working portion of the third blade to a predetermined distance.

19. The laying machine of claim 18, wherein the second compartment further comprises a third side wall extending between the first side wall and the second side wall and defining the outer edge of the second compartment, wherein the third side wall is at a distance closer to the second working portion and the third working portion than to the second central portion and the third central portion.

20. The laying machine of claim 18, wherein the second compartment is open ended toward the second working portion and the third working portion.

\* \* \* \* \*